(12) United States Patent
Yoo et al.

(10) Patent No.: US 10,986,265 B2
(45) Date of Patent: Apr. 20, 2021

(54) ELECTRONIC DEVICE AND CONTROL METHOD THEREOF

(71) Applicant: SAMSUNG ELECTRONICS CO., LTD., Suwon-si (KR)

(72) Inventors: Byeongwook Yoo, Suwon-si (KR); Deokho Kim, Suwon-si (KR); Gunill Lee, Suwon-si (KR); Wonwoo Lee, Suwon-si (KR); Jaewoong Lee, Suwon-si (KR); Sunghoon Yim, Suwon-si (KR); Jiwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/294,530

(22) Filed: Mar. 6, 2019

(65) Prior Publication Data
US 2020/0059596 A1    Feb. 20, 2020

(30) Foreign Application Priority Data

Aug. 17, 2018    (KR) .................. 10-2018-0095881

(51) Int. Cl.
*H04N 5/232* (2006.01)
*G06T 7/73* (2017.01)
(Continued)

(52) U.S. Cl.
CPC .......... *H04N 5/23222* (2013.01); *G06T 7/50* (2017.01); *G06T 7/73* (2017.01); *G06T 11/60* (2013.01);
(Continued)

(58) Field of Classification Search
None
See application file for complete search history.

(56) References Cited

U.S. PATENT DOCUMENTS

| | | | |
|---|---|---|---|
| 6,535,223 B1 * | 3/2003 | Foley | A61B 3/111 345/629 |
| 8,698,937 B2 | 4/2014 | Jeong | |

(Continued)

FOREIGN PATENT DOCUMENTS

| | | |
|---|---|---|
| JP | 2009-055449 A | 3/2009 |
| JP | 2012-239566 A | 12/2012 |

(Continued)

OTHER PUBLICATIONS

Search Report IP.com.*

(Continued)

*Primary Examiner* — Mohammad J Rahman
(74) *Attorney, Agent, or Firm* — Sughrue Mion, PLLC

(57) ABSTRACT

An electronic apparatus may include a camera; a storage; a display; and a processor configured to: obtain a three dimensional (3D) coordinate corresponding to a face region of a user included in an image captured by the camera; obtain position adjustment information for adjusting an image capture position of the camera based on a difference between the 3D coordinate of the face region and a reference 3D coordinate stored in the storage; and control the display to provide a guide graphic user interface (GUI) for adjusting the image capture position of the camera based on the position adjustment information.

17 Claims, 14 Drawing Sheets

(51) Int. Cl.
*G06T 7/50* (2017.01)
*G06T 11/60* (2006.01)

(52) U.S. Cl.
CPC ... *H04N 5/23219* (2013.01); *H04N 5/232935* (2018.08); *G06T 2207/30201* (2013.01); *G06T 2207/30244* (2013.01)

(56) References Cited

U.S. PATENT DOCUMENTS

| | | | |
|---|---|---|---|
| 9,412,169 B2* | 8/2016 | Bud | H04N 5/23229 |
| 9,600,714 B2* | 3/2017 | Nam | G06K 9/00281 |
| 9,762,791 B2 | 9/2017 | Deng | |
| 9,774,780 B1 | 9/2017 | Baldwin et al. | |
| 9,817,248 B2 | 11/2017 | Yang et al. | |
| 10,320,962 B1* | 6/2019 | Chang | H04M 1/0266 |
| 2006/0066723 A1* | 3/2006 | Iwase | G08B 13/19608 348/169 |
| 2008/0297617 A1 | 12/2008 | Jeong | |
| 2010/0266206 A1 | 10/2010 | Jo et al. | |
| 2012/0121126 A1* | 5/2012 | Hwang | G06K 9/00228 382/103 |
| 2013/0016094 A1* | 1/2013 | Cho | H04N 13/128 345/419 |
| 2013/0038759 A1* | 2/2013 | Jo | H04N 5/23293 348/240.99 |
| 2013/0093838 A1* | 4/2013 | Tan | H04N 7/144 348/14.16 |
| 2013/0136302 A1* | 5/2013 | Nam | G06K 9/00281 382/103 |
| 2014/0063060 A1* | 3/2014 | Maciocci | G06T 19/006 345/633 |
| 2015/0124155 A1* | 5/2015 | Li | H04N 5/23219 348/349 |
| 2015/0215615 A1* | 7/2015 | Chou | H04N 13/239 348/187 |
| 2015/0268743 A1* | 9/2015 | Takeuchi | G06F 1/1632 345/157 |
| 2015/0288742 A1* | 10/2015 | Flynn | H04L 67/10 709/217 |
| 2016/0071325 A1* | 3/2016 | Callaghan | G06T 19/006 345/633 |
| 2016/0091139 A1* | 3/2016 | Levine | F16M 13/04 294/139 |
| 2016/0127710 A1* | 5/2016 | Saban | G06T 11/00 386/241 |
| 2016/0148384 A1* | 5/2016 | Bud | G06T 11/60 348/207.11 |
| 2016/0178936 A1* | 6/2016 | Yang | G06T 11/60 351/246 |
| 2016/0198100 A1* | 7/2016 | Cho | G06K 9/00604 348/222.1 |
| 2016/0364561 A1* | 12/2016 | Lee | H04M 1/67 |
| 2017/0078585 A1 | 3/2017 | Wells | |
| 2017/0192651 A1* | 7/2017 | Yang | G06F 3/04845 |
| 2017/0206691 A1* | 7/2017 | Harrises | G02B 27/0172 |
| 2017/0329142 A1* | 11/2017 | Ye | B60K 37/04 |
| 2018/0070206 A1* | 3/2018 | Shingler | H04W 4/023 |
| 2018/0074697 A1* | 3/2018 | Kim | G06F 3/041 |
| 2018/0091772 A1* | 3/2018 | Han | A61B 5/7425 |
| 2018/0137638 A1* | 5/2018 | Taguchi | H04N 5/23264 |
| 2018/0158246 A1* | 6/2018 | Grau | G06T 3/0093 |
| 2018/0183738 A1* | 6/2018 | Parnell | G06F 3/0483 |
| 2018/0278919 A1* | 9/2018 | Lee | H04N 13/204 |
| 2018/0288391 A1* | 10/2018 | Lee | G06F 3/041 |
| 2018/0300917 A1* | 10/2018 | Barnett | G06T 11/60 |
| 2019/0057247 A1* | 2/2019 | Chen | G06K 9/00 |
| 2019/0058860 A1* | 2/2019 | Wang | G06F 3/012 |
| 2019/0073521 A1* | 3/2019 | Hsu | G06K 9/00248 |
| 2019/0172222 A1* | 6/2019 | Ebisawa | G06T 7/80 |
| 2019/0174054 A1* | 6/2019 | Srivastava | H04N 5/23293 |
| 2019/0174055 A1* | 6/2019 | Srivastava | H04N 5/23216 |
| 2019/0279393 A1* | 9/2019 | Ciuc | G06K 9/00268 |
| 2019/0333161 A1* | 10/2019 | Murphy-Chutorian | G06F 16/5838 |

FOREIGN PATENT DOCUMENTS

| | | |
|---|---|---|
| KR | 10-0700872 B1 | 3/2007 |
| KR | 10-2008-0021441 A | 3/2008 |
| KR | 10-0840023 B1 | 6/2008 |
| KR | 10-1477182 B1 | 12/2014 |
| KR | 10-2015-0121284 A | 10/2015 |
| KR | 10-1017-0048287 A | 5/2017 |

OTHER PUBLICATIONS

Written Opinion (PCT/ISA/237) issued by the International Searching Authority in corresponding International Application No. PCT/KR2019/009506, dated Nov. 21, 2019.

International Search Report (PCT/ISA/210), issued by International Searching Authority in corresponding International Application No. PCT/KR2019/009506, dated Nov. 21, 2019.

* cited by examiner (a)      (b)      (c)

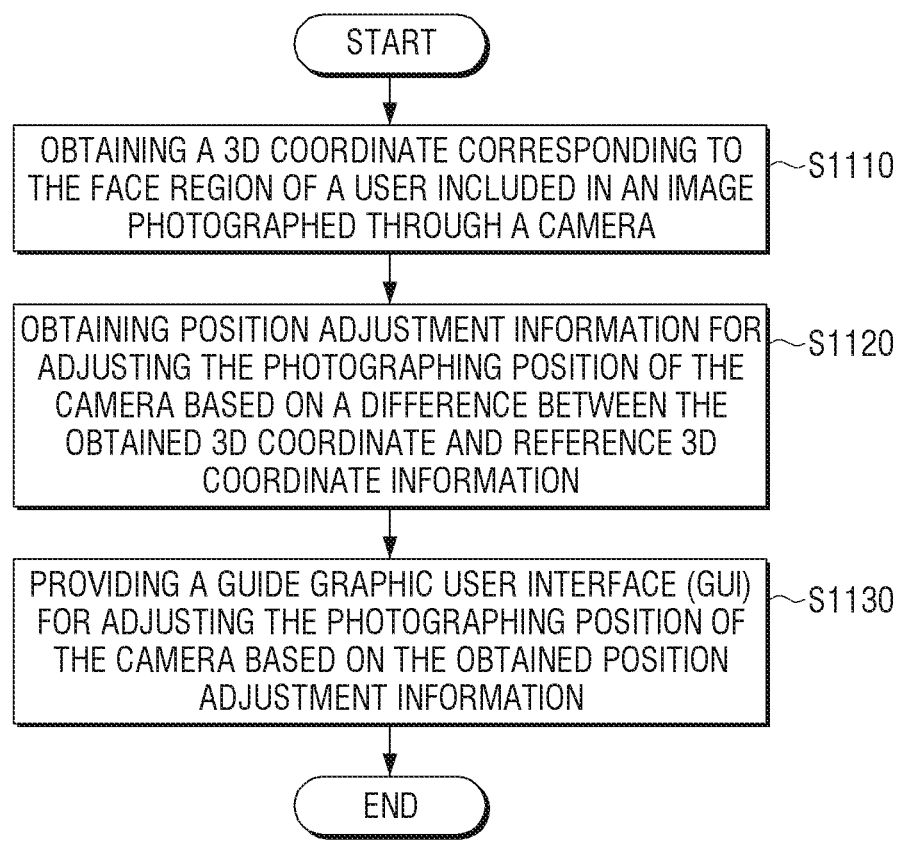

ELECTRONIC DEVICE AND CONTROL METHOD THEREOF

CROSS-REFERENCE TO RELATED APPLICATION(S)

This application is based on and claims priority from Korean Patent Application No. 10-2018-0095881 filed on Aug. 17, 2018, in the Korean Intellectual Property Office, the disclosure of which is incorporated herein by reference in its entirety.

BACKGROUND

1. Field

Apparatuses and methods consistent with example embodiments relate to guiding photographing positions.

2. Description of Related Art

As social network services are generally used in people's everyday lives, use of selfie photography and interest in it are on an increasing trend.

Following the increased use of social network services, people's need for taking best selfie photographs is also increasing. Accordingly, use of applications which recommend angles of selfie photographs, and applications which provide additional functions for editing selfie photographs such as filters, face image correction and stickers for selfie photographs is increasing.

Previously, such functions had a problem, which is that they could not analyze selfie photographs correctly, and thus they could neither recommend angles of selfie photographs to suit the user's intention nor edit selfie photographs precisely according to the user's intention.

SUMMARY

One or more example embodiments provide an electronic apparatus that analyzes a three-dimensional (3D) coordinate corresponding to a user image included in a photographed image and provides a guide for adjusting the photographing position, or provides editing features such as stickers to be added to a user image, and a control method thereof.

According to an aspect of an example embodiment, there is provided an electronic apparatus including: a camera; a storage; a display; and a processor configured to: obtain a three dimensional (3D) coordinate corresponding to a face region of a user included in an image captured by the camera; obtain position adjustment information for adjusting an image capture position of the camera based on a difference between the 3D coordinate of the face region and a reference 3D coordinate stored in the storage; and control the display to provide a guide graphic user interface (GUI) for adjusting the image capture position of the camera based on the position adjustment information.

The processor may be further configured to: obtain information for moving the face region of the user based on the difference between the 3D coordinate of the face region and the reference 3D coordinate, and control the display to provide the guide GUI for moving the face region of the user based on the information for moving the face region of the user.

The image capture position of the camera may include at least one of a photographing distance between the face region of the user and the camera, a photographing direction, and a photographing angle.

The guide GUI may include at least one of a moving distance of the camera, a moving direction of the camera, a rotating direction of the camera, and a degree of rotation of the camera.

The processor may be further configured to identify a plurality of feature points from the face region of the user, calculate information on distance between the plurality of feature points based on a number of pixels in the distance, and obtain the 3D coordinate of the face region based on the information on the distance.

The processor may be further configured to: receive position information of an external apparatus included in the image of the user, from the external apparatus; obtain first distance information between the electronic apparatus and the external apparatus based on the position information of the external apparatus; obtain second distance information between the external apparatus and at least one feature point included in the face region of the user; and obtain the 3D coordinate of the face region based on the first distance information and the second distance information.

The processor may be configured to receive, from an external electronic apparatus, an image of the electronic apparatus, and obtain the 3D coordinate of the face region based on comparison between a size of the electronic apparatus obtained from the image of the electronic apparatus and an actual size of the electronic apparatus stored in the storage.

The external electronic apparatus may be an augmented reality (AR) glass including a camera.

The processor may be further configured to control the display to adjust at least one of a size, a direction, and a form of a sticker to be added to the image of the user on the 3D coordinate of the face region, and display the image of the user with the sticker.

The processor may be configured to control the camera to automatically photograph based on determining that the image capture position of the camera matches a target position.

According to an aspect of another example embodiment, there is provided a method of controlling an electronic apparatus storing a reference three-dimensional (3D) coordinate, the method including: obtaining a 3D coordinate corresponding to a face region of a user included in an image captured by a camera; obtaining position adjustment information for adjusting an image capture position of the camera based on a difference between the 3D coordinate of the face region and the reference 3D coordinate; and providing a guide graphic user interface (GUI) for adjusting the image capture position of the camera based on the position adjustment information.

The method may further include: obtaining information for moving the face region of the user based on the difference between the 3D coordinate of the face region and the reference 3D coordinate; and providing a guide GUI for moving the face region of the user based on the information for moving the face region of the user.

The image capture position of the camera may include at least one of a photographing distance between the face region of the user and the camera, a photographing direction, and a photographing angle.

The guide GUI may include at least one of a moving distance of the camera, a moving direction of the camera, a rotating direction of the camera, and a degree of rotation of the camera.

The obtaining the 3D coordinate may include: identifying a plurality of feature points from the face region of the user, calculating information on a distance between the plurality of feature points based on a number of pixels in the distance, and obtaining the 3D coordinate of the face region based on the information on the distance.

The obtaining the 3D coordinate may include: receiving, position information of an external apparatus included in the image captured by the camera, from the external apparatus; obtaining first distance information between the electronic apparatus and the external apparatus based on the position information of the external apparatus; obtaining second distance information between the external apparatus included in the image and at least one feature point included in the face region of the user; and obtaining the 3D coordinate based on the first distance information and the second distance information.

The obtaining the 3D coordinate may include: based on receiving, from an external electronic apparatus, an image including the electronic apparatus, obtaining the 3D coordinate by comparing a size of the electronic apparatus obtained from the image received from the external apparatus with a pre-stored actual size of the electronic apparatus.

The external electronic apparatus is an augmented reality (AR) glass including a camera.

The method may further include: adjusting at least one of a size, a direction, and a form of a sticker to be added to the user in the image based on the 3D coordinate of the face region, and displaying the image with the sticker.

According to an aspect of another example embodiment, there is provided a non-transitory computer-readable storage medium storing a program that is executable by a computer to perform a method of controlling an electronic apparatus storing a reference three-dimensional (3D) coordinate, the method including: obtaining a 3D coordinate corresponding to a face region of a user included in an image photographed by a camera; obtaining position adjustment information for adjusting an image capture position of the camera based on a difference between the 3D coordinate of the face region and the reference 3D coordinate; and providing a guide graphic user interface (GUI) for adjusting the image capture position of the camera based on the position adjustment information.

According to an aspect of another example embodiment, there is provided an electronic apparatus including: a storage configured to store reference coordinates; a camera configured to capture an image of a user; a processor configured to: extract facial feature points from the image of the user, determine a difference between the reference coordinates and coordinates of the facial feature points; generate a graphic item that indicates a movement direction of the electronic apparatus to decrease the difference between the reference coordinates and coordinates of the facial feature points.

The processor may be further configured to gradually increase or decrease a size of the graphic item in proportion to a change in the difference between the reference coordinates and coordinates of the facial feature points.

The graphic item may include an arrow that indicates at least one of a horizontal movement direction, a vertical movement direction, and a rotation angle of the electronic apparatus.

As described above, according to the various embodiments of the disclosure, an electronic apparatus provides a guide that adjusts photographing positions based on 3D coordinate information, and thus photography may be performed in a composition intended by a user. Also, an electronic apparatus may provide precise editing functions such as adjusting a sticker to be added to a user image precisely based on 3D coordinate information.

BRIEF DESCRIPTION OF THE DRAWINGS

The above and/or other aspects will be more apparent by describing certain example embodiments, with reference to the accompanying drawings, in which:

FIG. 11 is a flow chart for illustrating a method of controlling an electronic apparatus according to an example embodiment.

DETAILED DESCRIPTION

Figure 1:
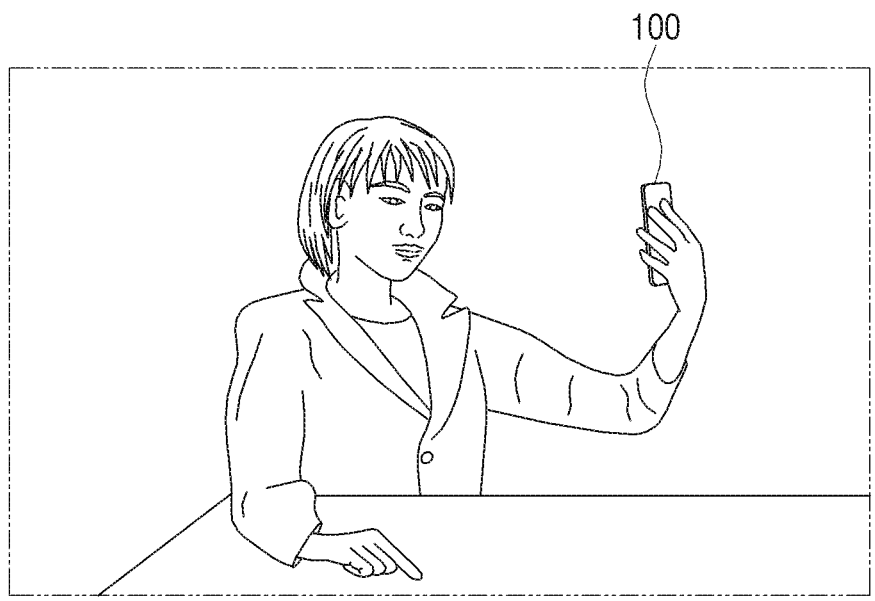
FIG. 1 is a diagram for illustrating an operation of performing selfie photography by using an electronic apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As terms used in the embodiments of the disclosure, general terms that are currently used widely were selected as far as possible, in consideration of the functions described in the disclosure. However, the terms may vary depending on the intention of those skilled in the art, previous court decisions or emergence of new technologies. Also, in particular cases, there may be terms that were arbitrarily designated by the applicant, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

In addition, the expressions "first," "second" and the like used in the disclosure may be used to describe various elements, but the expressions are not intended to limit the elements. Such expressions are used only to distinguish one element from another element.

Also, singular expressions may be interpreted to include plural expressions, unless defined obviously differently in the context. In this specification, terms such as 'include' and 'consist of' should be construed as designating that there are such characteristics, numbers, steps, operations, elements, components or a combination thereof in the specification, but not as excluding in advance the existence or possibility of adding one or more of other characteristics, numbers, steps, operations, elements, components or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Also, "a module" or "a part" in the disclosure perform at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating an operation of performing selfie photography, i.e., an operation of taking a selfie or an operation of capturing a selfie, by using an electronic apparatus according to an example embodiment.

As illustrated in FIG. 1, an electronic apparatus 100 may be implemented as a mobile phone such as a smartphone, but the present embodiment is not limited thereto, and the electronic apparatus may be implemented as various types of apparatuses including a camera function and a display function, such as a tablet personal computer (PC), a mobile phone, an e-book, a desktop personal computer (PC), a laptop personal computer (PC), a netbook computer, a personal digital assistant (PDA), a portable multimedia player (PMP), an MP3 player, a mobile medical instrument, a camera, a camcorder, an electronic photo frame or a wearable device (e.g., a head-mounted-device (HMD) smart watch, electronic clothing, an electronic bracelet, an electronic necklace and the like), a near eye display (NED), a large format display (LFD), digital signage, a Digital Information Display (DID) and a video wall. Also, the display apparatus 100 has a touch screen embedded therein, and thus the apparatus may be implemented such that a program can be executed by using a finger or a pen (e.g., a stylus pen).

According to an embodiment of the disclosure, in case in which a user takes a photograph (i.e., takes an image, captures an image, etc.) including himself/herself using the electronic apparatus 100, the electronic apparatus 100 may provide guide information so that the user may obtain a desirable photograph. In the present disclosure, the term "selfie" may refer to an image that includes oneself (with another person or a part of a group) and is taken by oneself using a camera. For example, the electronic apparatus 100 may provide guide information based on a three-dimensional (3D) coordinate corresponding to the face region of a user in a real-time photographed image.

Figure 2:
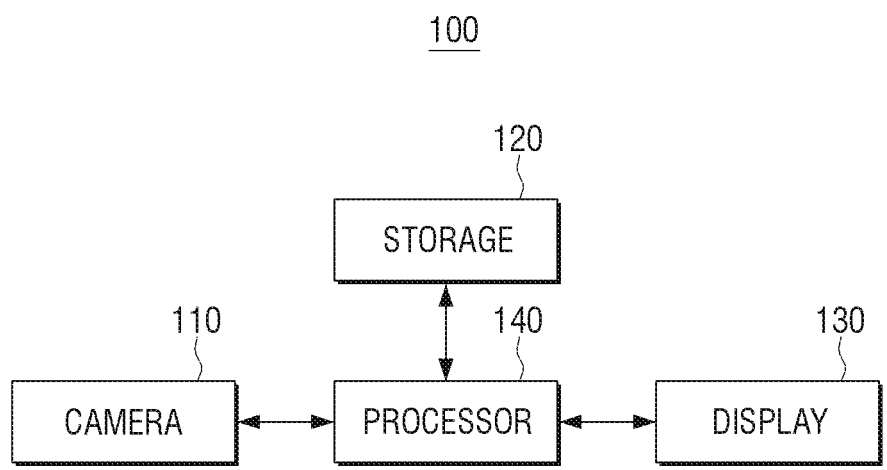
FIG. 2 is a block diagram for illustrating an electronic apparatus according to an example embodiment.

FIG. 2 is a block diagram for illustrating an electronic apparatus according to an example embodiment.

According to FIG. 2, the electronic apparatus 100 includes a camera 110, a storage 120, a display 130 and a processor 140.

The camera 110 may obtain an image by photographing an object according to a user instruction. Here, a user instruction may be in various forms such as a touch input, a button input, a voice input and a motion input.

When an object is photographed through the camera 110, the object is converted into an electronic image signal through a semiconductor optical element, such as a charge coupled device (CCD), and the electronic image signal is amplified and converted into a digital signal by an analog signal processor. Then, the digital signal is processed by a digital signal processor, and the processor 140 may control the display 130 to adjust color and brightness of an image that is represented by the digital signal and to display the image with the adjusted color and brightness.

Here, the displayed image may be a still image or a moving image. The camera 110 may photograph a still image at a specific time point, or may continuously photograph still images. Also, the camera 110 may provide an image obtained under the control of the processor 140 to the display 130.

The camera 110 may be implemented in a plural number, such as a front camera provided on the front surface of the electronic apparatus 100 and a rear camera provided on the rear surface of the electronic apparatus 100. For example, selfie photography of which subject is a user may be performed through a front camera.

Meanwhile, the storage 120 may store various types of data, programs or applications for driving/controlling the electronic apparatus 100. The storage 120 may store a control program for controlling the electronic apparatus 100 and the processor 140, applications that were initially provided by the manufacturer or downloaded from the outside, databases or relevant data.

In particular, the storage 120 may store at least one of reference 3D coordinate information or reference image information. Here, reference 3D coordinate information is information on a 3D coordinate which was obtained from a reference image, and which corresponds to the face region included in the reference image. The reference image may be at least one of an image selected by a user or an image provided by the electronic apparatus 100, or it may be a target image aimed by an image photographed by a user.

Further, the storage 120 may store information on the actual size of the electronic apparatus 100. To be specific, the storage 120 may store information on sizes such as the horizontal length, longitudinal length and thickness of the electronic apparatus 100.

Meanwhile, the storage 120 may be implemented as internal memory such as read-only memory (ROM) and random-access memory (RAM) included in the processor 140, or it may be implemented as separate memory from the processor 140. In this case, the storage 120 may be implemented in the form of memory embedded in the electronic apparatus 100, or memory that can be attached to or detached from the electronic apparatus 100, depending on the use of the stored data. For example, in the case of data for driving the electronic apparatus 100, the data may be stored in memory embedded in the electronic apparatus 100, and in the case of data for the extending function of the electronic apparatus 100, the data may be stored in memory that can be attached to or detached from the electronic apparatus 100. Meanwhile, in the case of memory embedded in the electronic apparatus 100, the memory may be implemented in the form of nonvolatile memory, volatile memory, a hard disc drive (HDD) or a solid state drive (SSD).

According to another example embodiment, it is possible that at least one of reference 3D coordinate information or reference image information is received from a server. Here, a server may be implemented as a cloud server, but is not limited thereto. A server may also be implemented as an external server or an embedded server provided in the electronic apparatus 100, depending on its form of physical implementation.

The display 130 displays various contents such as a still image, a moving image, texts and music, an application execution screen including various contents, a graphic user interface (GUI) screen and the like.

Also, the display 130 may display an image (e.g., a preview image or a photographed image) that is being photographed through the camera 110. In addition, the display 130 may provide a guide GUI for adjusting the photographing position, i.e., the image capture position, of the camera 110 by the control of the processor 140 and a guide GUI (or a guide graphic item) for moving the face region of a user. Further, the display 130 may provide a filtering effect such as a sticker to be added to a user image included in a photographed image by the control of the processor 140.

Meanwhile, the display 130 may be implemented in various forms such as a liquid crystal display (LCD), an organic light-emitting diode (OLED), liquid crystal on silicon (LCoS), digital light processing (DLP), a quantum dot (QD) and a micro light-emitting diode (LED) display. In particular, the display 130 may be implemented in the form of a touch screen that forms an interlayer structure with a touch pad. In this case, the display 130 may be used as a user interface as described above, as well as an output device. Here, a touch screen may be constituted such that it can detect the pressure of a touch input as well as the location and area of a touch input.

The processor 140 controls the overall operation of the electronic apparatus 100.

According to an example embodiment, the processor 140 may be implemented as a digital signal processor (DSP) processing digital signals, a microprocessor and a time controller (TCON). However, the disclosure is not limited thereto, and the processor 140 may include one or more of a central processing unit (CPU), a micro controller unit (MCU), a micro processing unit (MPU), a controller, an application processor (AP) or a communication processor (CP) and an ARM processor, or may be defined by the terms. Also, the processor 140 may be implemented as a system on chip (SoC) or a large scale integration (LSI) having a processing algorithm embedded therein, or as a field programmable gate array (FPGA).

Further, the processor 140 may obtain a 3D coordinate corresponding to the face region of a user included in an image photographed through the camera 110. Here, the photographed image may be an image in a preview state where the face region of a user can be checked through the display 130. Meanwhile, the 3D coordinate is a coordinate of which starting point is the camera 110, and it may be implemented as coordinate systems in various forms, such as a rectangular coordinate system, a polar coordinate system and a spherical coordinate system.

Meanwhile, the processor 140 may obtain a 3D coordinate corresponding to the face region of a user by using various methods.

According to an example embodiment, the processor 140 may obtain a 3D coordinate corresponding to the face region of a user from a photographed two-dimensional (2D) image. For example, the processor 140 may calculate information on the distance among feature points of the face region of a user based on the number of pixels, and thereby obtain a 3D coordinate.

According to another example embodiment, the processor 140 may obtain a 3D coordinate by receiving position information from an external apparatus (e.g., an accessory attached to a user) provided with a sensor, which is included in a photographed image. For example, the processor 140 may obtain a 3D coordinate based on the distance between the electronic apparatus 100 and an external apparatus, which was calculated based on the position information received from the external apparatus.

According to still another example embodiment, the processor 140 may obtain a 3D coordinate based on an image received from an external electronic apparatus such as an augmented reality (AR) glass worn by a user. For example, the processor 140 may calculate the distance between the electronic apparatus 100 and the face region of a user by comparing information on the size of the electronic apparatus 100 calculated from a received image with information on the actual size of the electronic apparatus 100, and thereby obtain a 3D coordinate.

Further, the processor 140 may obtain position adjustment information for adjusting the photographing position of the camera 110 based on a difference between the obtained 3D coordinate and the reference 3D coordinate information stored in the storage 120. Here, the reference 3D coordinate information is information on a 3D coordinate which was obtained from a reference image, and which corresponds to the face region included in the reference image. The reference image may be at least one of an image selected by a user or an image provided by the electronic apparatus 100, or it may be a target image aimed by an image photographed by a user.

Meanwhile, position adjustment information may include the moving distance of the camera 110 by which the camera is to be moved, the moving direction of the camera, the rotating direction of the camera and the degree of rotation of the camera, according to the difference between the obtained 3D coordinate and the reference 3D coordinate information.

Here, the position adjustment information may be 3D coordinate information corresponding to the difference between the obtained 3D coordinate and the reference 3D coordinate information.

The processor 140 may control the display 130 to provide a guide GUI for adjusting the photographing position of the camera 110 based on the obtained position adjustment information.

Here, the photographing position of the camera 110 may include at least one of the photographing distance between the face region of the user and the camera 110, the photographing direction or the photographing angle.

Meanwhile, a guide GUI may be a sign including at least one of the moving distance of the camera 110, the moving direction of the camera 110, the rotating direction of the camera 110 or the degree of rotation of the camera 110. For example, a guide GUI may be provided as a sign in the shape of an arrow that indicates directions on the display 130 for displaying the moving direction and the rotating direction. Also, a guide GUI may be provided in the form of indicating a clockwise direction or a counterclockwise direction through an arrow shape.

The processor 140 may display XYZ axes in an area of the display 130, and display a guide GUI on the XYZ axes. Accordingly, the guide GUI may be displayed more stereoscopically.

In addition, the processor 140 may indicate the moving distance and degree of rotation of the camera 110 by adjusting the length of an arrow. That is, the processor 140 may display the length of an arrow to be proportional to the moving distance and degree of rotation of the camera 110. For example, in a case in which the camera 110 needs to be moved to the right side by 20 cm based on the obtained position adjustment information, the processor 140 may display an arrow having a length of 2 cm on the right side of the display 130. Afterwards, when the camera 110 is moved to the right side by 10 cm, the processor 140 may adjust the length of the arrow to 1 cm.

According to another example embodiment, the processor 140 may obtain information for moving the face region of a user based on a difference between a 3D coordinate corresponding to the face region of a user included in a photographed image and the reference 3D coordinate information stored in the storage 120, and control the display 130 to provide a guide GUI for moving the face region of the user based on the obtained information. Here, the information for moving the face region of the user may include information on the moving distance by which the face region of the user is to be moved, the moving direction, the rotating direction and the degree of rotation according to the difference between the obtained 3D coordinate and the reference 3D coordinate information. Further, the information for moving the face region of the user may include a distance between the center of the photographed image and the center of the face region. The information for moving the face region of the user may be 3D coordinate information corresponding to the difference between the obtained 3D coordinate and the reference 3D coordinate information.

That is, the processor 140 may provide the display 130 with a guide GUI for guiding movement of the face region of a user, while maintaining the photographing position of the camera 110.

To be specific, the processor 140 may provide the display 130 with a guide GUI corresponding to the face of a user in a target position based on the information for moving the face region of the user. For example, a guide GUI may be implemented in the form of a circle or an oval, and may guide such that the face region of a user is positioned on the guide GUI. Alternatively, the guide GUI may guide such that the face region of a user is positioned on the guide GUI by displaying the face image of the user in a target position. However, the disclosure is not limited thereto, and a guide GUI can obviously be implemented in various forms as long as it performs the role of guiding movement of a user's body.

According to still another example embodiment, the processor 140 may provide a guide for adjusting the photographing position of the camera 110 or moving the face region of a user as voice. For example, the processor 140 may provide voice such as "Move the camera to the right side by 10 cm" or "Tilt your face to the left side by 15 degrees" through a speaker, based on the obtained position adjustment information or information for moving the face region of a user.

For example, when reference 3D coordinate information is obtained from a reference image in which the user is not gazing at the camera 110, the processor 140 may provide guidance on posture that makes the user not gaze at the display 130. In a case in which a user cannot gaze at the camera 110 according to the guidance, the user cannot recognize a guide GUI provided on the display 130 since the user cannot look at the screen of the display 130. In such a case, a voice guide may be used instead of a visual guide.

Meanwhile, the processor 140 may additionally provide a voice guide, as well as providing the display 130 with a guide GUI for adjusting the photographing position of the camera 110 or a guide GUI for moving the face region of a user.

Hereinafter, various embodiments of the disclosure wherein a 3D coordinate is obtained from a photographed image will be described.

According to an example embodiment, the processor 140 may identify a plurality of feature points from the face region of a user, calculate information on the distance among the feature points based on the number of pixels, and obtain a 3D coordinate based on the calculated distance information. Here, the feature points may be extracted from at least one of the eye, nose or mouth of the user in the photographed image. As an example, the processor 140 may group the entire pixels in a photographed image into a plurality of blocks consisting of n*m pixels, identify whether there is a feature point in each block, and thereby identify feature points in the face region of the user.

The processor 140 may calculate distance information such as the size of the eye, the distance between the eyes, the length of the nose and the length of the lip based on the number of pixels. Further, the processor 140 may obtain a 3D coordinate corresponding to the face region of a user by correcting the distance information to be more precise by comparing the calculated distance information with information on average faces stored in the storage 120 or the stored information on the face of the user. For example, the processor 140 may calculate distance information for the size of the eye based on the number of pixels of a photographed image, and obtain information on the size of the eye by comparing the distance information with the stored distance information for an average eye size.

Also, the processor 140 may calculate information on angles based on comparison of the sizes of the eyes, the angle of the line connecting the eyes, the angle of the nose line and the angle of the lip line.

For example, the processor 140 may identify facial feature points based on a rectangular 3D coordinate system in which the starting point is assumed as the location of the camera 110. In particular, the processor 140 may identify the eye, nose and mouth in the face region of a user as feature points, and obtain a rectangular coordinate value of which starting point is the camera 110, based on the number of pixels. As an example, the processor 140 may obtain a 3D coordinate for the eye, nose and mouth such as {Xeye=6 cm, Yeye=8 cm, Zeye=20 cm}, {Xnose=7 cm, Ynose=5 cm, Znose=18 cm} and {Xlip=5 cm, Ylip=13 cm, Zlip=22 cm}.

The processor 140 may obtain position adjustment information for adjusting the photographing position of the camera 110 based on a difference between the obtained 3D coordinate and the reference 3D coordinate information stored in the storage 120.

For example, the processor 140 may obtain {Xeye=4 cm, Yeye=−1 cm, Zeye=9 cm}, {Xnose=2 cm, Ynose=3 cm, Znose=7 cm} and {Xlip=3 cm, Ylip=6 cm, Zlip=8 cm} corresponding to the difference value between the 3D coordinate obtained for the eye, nose and mouth and the reference 3D coordinate information as position adjustment information.

The electronic apparatus 100 may calculate the target position of the camera 110 guided by a guide GUI, by using a rotation transformation matrix as follows.

$$\begin{bmatrix} X' \\ Y' \\ Z' \end{bmatrix} = R_\theta R_\Phi R_\Psi \left( \begin{bmatrix} X \\ Y \\ Z \end{bmatrix} + \begin{bmatrix} Xcam \\ Ycam \\ Zcam \end{bmatrix} \right) \quad \text{[Formula 1]}$$

$$R_\theta = \begin{bmatrix} 1 & 0 & 0 \\ 0 & \cos\theta & -\sin\theta \\ 0 & \sin\theta & \cos\theta \end{bmatrix},$$

$$R_\Phi = \begin{bmatrix} \cos\Phi & 0 & \sin\Phi \\ 0 & 1 & 0 \\ -\sin\Phi & 0 & \cos\Phi \end{bmatrix}, R_\Psi = \begin{bmatrix} \cos\Psi & -\sin\Psi & 0 \\ \sin\Psi & \cos\Psi & 0 \\ 0 & 0 & 1 \end{bmatrix},$$

Here, $\theta$(X axis), $\Phi$(Y axis) and $\Psi$(Z axis) denote the angle of the camera 110 which is to be changed based on the position adjustment information, and Xcam, Ycam and Zcam denote the distance of the camera 110 by which the camera is to be moved. Meanwhile, X, Y and Z denote a 3D coordinate corresponding to the position adjustment information, and X', Y' and Z' denote a 3D coordinate corresponding to the target position guided by a guide GUI.

The electronic apparatus 100 may calculate the target position of the camera 110 based on Formula 1 described above.

In a case in which the position of the camera 110 is moved to the target position according to the guide GUI, the 3D coordinate obtained in the target position and the reference 3D coordinate information may be identical.

The processor 140 may provide the display 130 with a guide GUI for adjusting the position of the camera 110 based on the obtained position adjustment information.

Figure 5:
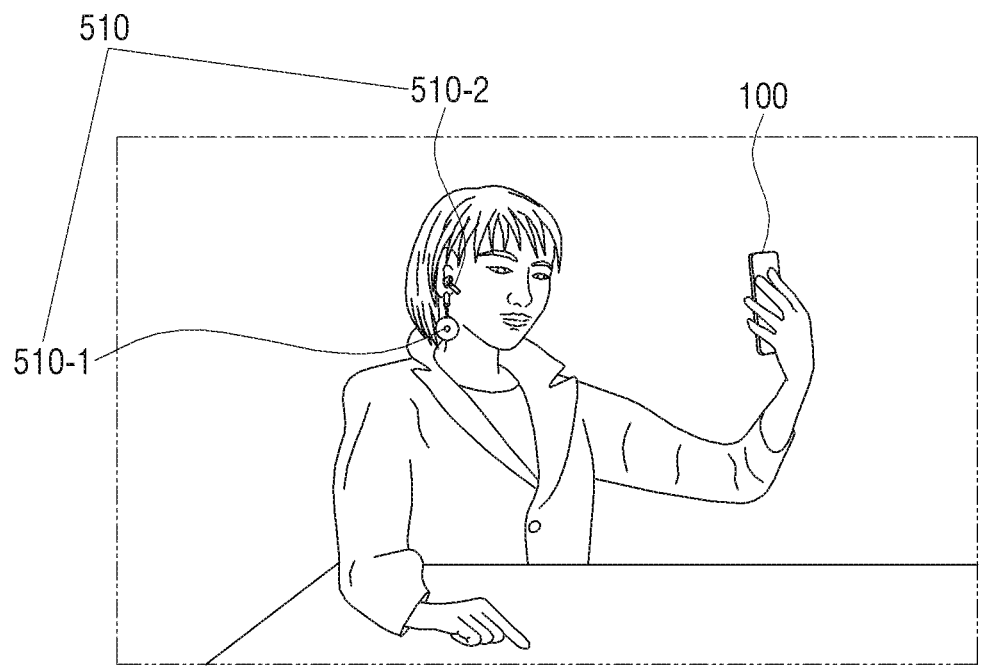
FIG. 5 is a diagram for illustrating the process of obtaining a three-dimensional (3D) coordinate based on the position information received from an external apparatus according to another example embodiment.

FIG. 5 is a diagram for illustrating the process of obtaining a 3D coordinate based on the position information received from an external apparatus according to another example embodiment.

According to FIG. 5, the processor 140 may receive the position information of the external apparatus 510 via a communication interface. The external apparatus 510 may be present in an image photographed by the electronic apparatus 100. The processor 140 may obtain first distance information between the electronic apparatus 100 and the external apparatus 510 based on the received position information. Also, the processor 140 may obtain second distance information between the external apparatus 510 included in the photographed image and at least one feature point included in the face region of the user. Further, the processor 140 may obtain a 3D coordinate based on the first distance information and the second distance information.

Here, the external apparatus 510 is an apparatus provided with a sensor that can calculate distance from the electronic apparatus 100. For example, the external apparatus 510 may be implemented as accessories such as earrings 510-1 and necklaces or earphones 510-2, and the like. However, the disclosure is not limited thereto, and the external apparatus 510 can be implemented in various forms, if it is an apparatus provided with a sensor that can calculate distance from the electronic apparatus 100, and is attachable to a user.

Meanwhile, position information may include at least one of the distance and the angle between the electronic apparatus 100 and the external apparatus 510.

The type of the sensor in the external apparatus 510 may include an infrared ray (IR) sensor, an accelerometer, an angular velocity sensor, a gyro sensor, a hall sensor, an ultrasonic sensor and the like.

An IR sensor is a sensor that emits infrared ray and measures distance according to the amount of the infrared ray reflected on a reflecting object. Based on a value measured by an IR sensor, the distance between the electronic apparatus 100 and the external apparatus 510 can be measured.

An accelerometer can detect the orientation of gravity. Also, an accelerometer can detect tilt in a motionless state. In addition, an accelerometer can detect the amount of change of the velocity with respect to a time unit. An accelerometer may be implemented as a three-axis accelerometer. In case an accelerometer is implemented as a three-axis accelerometer, the accelerometer includes accelerometers of x, y and z axes that are disposed in different directions from one another, and are orthogonal to one another. The accelerometer converts the output values of each of the accelerometers of x, y and z axes into digital values, and provide the values to a preprocessor. Here, the preprocessor may include a chopping circuit, an amplifying circuit, a filter, an analog-to-digital (A/D) converter and the like. Accordingly, an electronic signal output from the three-axis accelerometer is chopped, amplified and filtered, and is then converted into a digital voltage value. Then, the angle between the electronic apparatus 100 and the external apparatus 510 can be measured based on the value measured by the accelerometer.

A gyro sensor is a sensor that detects the amount of change of the preset direction of a user terminal device 200 during a time unit, and thereby detects the angular velocity. As a gyro sensor, a gyroscope having three axes may be used. Through the definite integral value of the angular velocity detected by the gyro sensor, the angle between the electronic apparatus 100 and the external apparatus 510 can be measured.

A hall sensor is a sensor that measures the magnetic field. Based on the size of the magnetic field measured at the hall sensor, the distance between the electronic apparatus 100 and the external apparatus 510 can be measured.

Meanwhile, the processor 140 may obtain second distance information which is the distance information between the external apparatus 510 and at least one feature point included in the face region of the user based on the number of pixels. Also, the processor 140 may correct the second distance information to be more precise by comparing the calculated second distance information with the information on average bodies stored in the storage 120 or the stored information on the user's body. For example, when the external apparatus 510 is an earphone 510-2 including a sensor, the processor 140 may calculate the distance between the ear to which the earphone 510-2 is attached and the nose based on the number of pixels. Afterwards, the processor 140 may correct the second distance information to be more precise by comparing the distance calculated based on the number of pixels with the distance between the ear and the nose stored in the storage 120. Specifically, the processor 140 may calculate a difference between the calculated distance and the distance stored in the storage 120, and may scale down the calculated down by applying a weight less than 1 to the calculated distance when the difference is greater than a predetermined threshold. For example, the weight may have a value greater than 0.5 and less than 1, and the value of the weight may decrease in proportion to the amount of the difference exceeding the predetermined threshold.

Also, the processor 140 may obtain a 3D coordinate based on the first distance information and the second distance information. Afterwards, the processor 140 may obtain position adjustment information for adjusting the photographing position of the camera 110 based on a difference between the obtained 3D coordinate and the reference 3D coordinate information stored in the storage 120, and provide a guide GUI for adjusting the photographing position of the camera 110 based on the obtained position adjustment information.

In an embodiment in which a 3D coordinate is obtained based on information received from the external apparatus 510, the distance information between the electronic apparatus 100 and the external apparatus 510 is relatively correct. Accordingly, a precise 3D coordinate corresponding to the face region of the user can be obtained.

Figure 6:
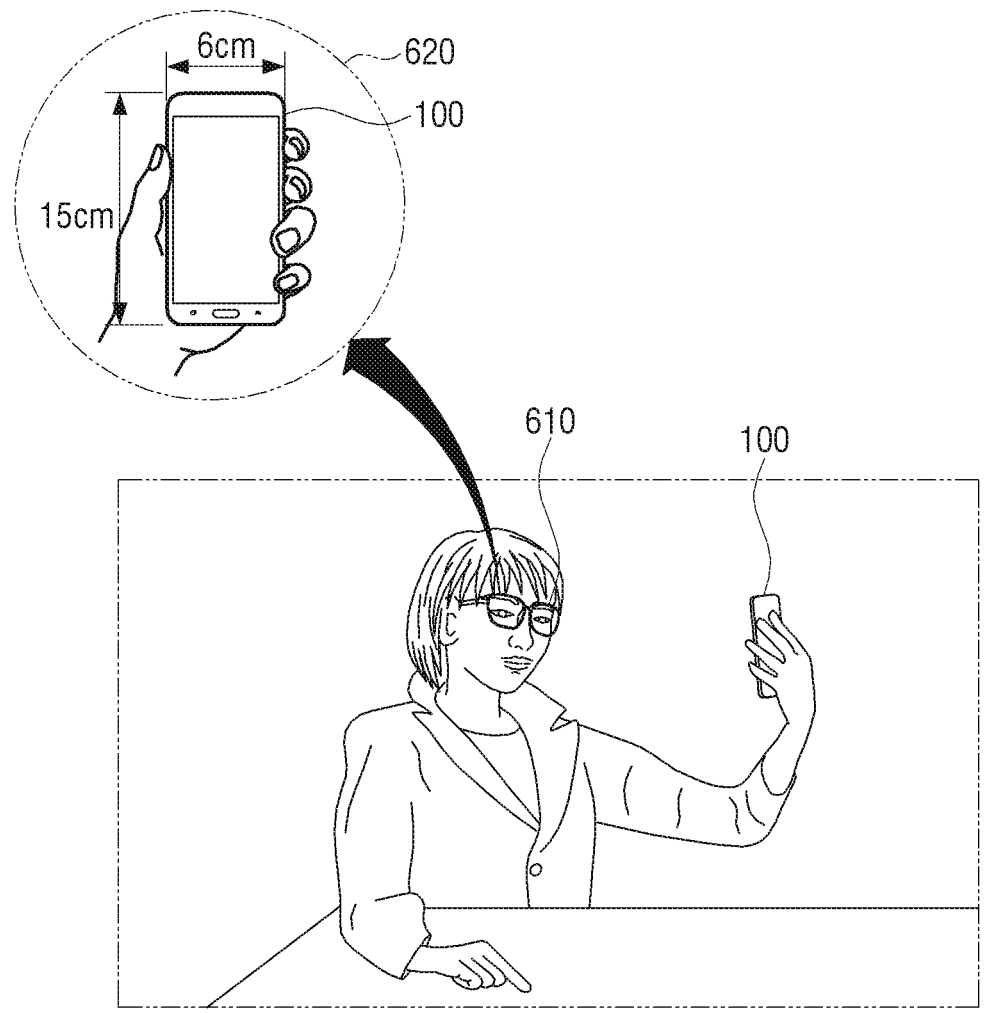
FIG. 6 is a diagram for illustrating the process of obtaining a 3D coordinate based on an image received from an external electronic apparatus according to still another example embodiment.

FIG. 6 is a diagram for illustrating the process of obtaining a 3D coordinate based on an image received from an external electronic apparatus according to still another example embodiment.

According to FIG. 6, the processor 140 may receive, from the external electronic apparatus 610, an image 620 including the electronic apparatus 100 through the communication interface. The processor 140 may compare the size of the electronic apparatus 100 obtained from the received image 620 with the actual size of the electronic apparatus 100 stored in the storage 120, and thereby obtain a 3D coordinate.

Here, the external electronic apparatus 610 may be implemented as augmented reality (AR) glass including the camera 110. Also, the size may be information including the horizontal length, longitudinal length and thickness of the electronic apparatus 100.

The processor 140 may calculate the distance between the electronic apparatus 100 and the face region of the user by comparing the size of the electronic apparatus 100 calculated from the image 620 received from the external electronic apparatus 610 with the actual size of the electronic apparatus 100. Also, the processor 140 may calculate the size of the electronic apparatus 100 from the received image 620 based on the number of pixels.

For convenience of explanation, it is assumed that the storage 120 stores a length of 15 cm and a width of 6 cm as the actual dimension of the electronic apparatus 100. Here, the terms "length" may be also referred to as "longitudinal length" or "horizontal length", and the term "width" may be also referred to as "vertical length". If the horizontal length of the electronic apparatus 100 included in the received image 620 is 6 cm, and the longitudinal length is 15 cm, the processor 140 may calculate the number of pixels in the horizontal length and in the longitudinal length of the electronic apparatus 100. Further, the processor 140 may calculate the relation between the number of pixels and the actual size, and calculate the distance between the electronic apparatus 100 and the face region of the user based on the calculated information.

Also, the processor 140 may obtain a 3D coordinate based on the calculated distance between the electronic apparatus 100 and the face region of the user. Afterwards, the processor 140 may obtain position adjustment information for adjusting the photographing position of the camera 110 based on the difference between the obtained 3D coordinate and the reference 3D coordinate information stored in the storage 120, and provide a guide GUI for adjusting the photographing position of the camera 110 based on the obtained position adjustment information.

As described above, the distance between the electronic apparatus 100 and the face region of the user can be calculated relatively precisely by comparing the size of the electronic apparatus 100 calculated from the image 620 received from the external electronic apparatus 610 with the actual size of the electronic apparatus 100. Thus, the processor 140 can obtain a precise 3D coordinate corresponding to the face region of the user.

Here, the external electronic apparatus 610 may be implemented in various forms other than AR glass, if it is an apparatus that can photograph the electronic apparatus 100 and transmit the photographed image to the electronic apparatus 100.

Returning to FIG. 2, when the photographing position of the camera 110 is adjusted to a target position, the processor 140 may perform photographing automatically. Also, the processor 140 may obtain position adjustment information based on a difference between a 3D coordinate corresponding to the face region of the user included in a photographed image and reference 3D coordinate information in real time. Further, the processor 140 may perform photographing an image automatically, based on identifying that the 3D coordinate and the reference 3D coordinate information are identical based on the position adjustment information that is measured in real time (i.e., if the photographing position is adjusted to a target position or the face region of the user is moved to a target position).

When the photographing position of the camera 110 or the face region of the user is adjusted to a target position, photographing is performed without a user's manipulation. Thus, photographing can be performed in a state wherein the user is not ready for photographing. Accordingly, the processor 140 may provide a feedback informing that the photographing position of the camera 110 or the face region of the user is adjusted to a target position, or perform photographing automatically after a preset time has lapsed after providing a feedback. Here, a feedback may be in the form of, for example, vibrating the electronic apparatus 100, or outputting specific sound or voice. Alternatively, a feedback may be in the form of an LED light source emitting light.

The processor 140 may control the display 130 to adjust at least one of the size, direction or form of a sticker to be added to a user image included in a photographed image based on a 3D coordinate corresponding to the face region of the user included in the photographed image, and display the image. As various embodiments of obtaining a 3D coordinate corresponding to the face region of a user were described earlier, detailed description therefor will be omitted.

Here, a sticker may be all objects added to a user image to decorate the user image included in a photographed image. For example, a sticker may be implemented in a form wherein a shape in the form of a rabbit's ears is added to the face region of a user image, or in a form wherein a cosmetic effect is applied to a user image. However, the disclosure is not limited thereto, and a sticker can obviously be implemented in various forms if it is an object that can decorate a user image.

The processor 140 may adjust at least one of the size, direction or form of a sticker to be added to a user image based on the obtained 3D coordinate.

For example, a sticker in the shape of rabbit ears may be added to the head portion of the face region of a user. In that case, the processor 140 may add a sticker based on the state of the user image based on a 3D coordinate. For example, if a user looks at the left, the processor 140 may express a cubic effect by adjusting the sizes of the rabbit's left and right ears to match the user's line of sight. Afterwards, if the user looks at the right, the processor 140 may readjust the sizes of the rabbit's left and right ears.

As described above, according to an example embodiment, a sticker is applied based on a 3D coordinate. Accordingly, a sticker can be applied to a user image while being adjusted relatively precisely.

Meanwhile, in a case in which the electronic apparatus 100 is implemented as AR glass, the AR glass may obtain position adjustment information for adjusting the photographing position of a smart phone based on a difference between a 3D coordinate corresponding to the face region of a user included in a photographed image and the stored reference 3D coordinate information. Then, based on the obtained position adjustment information, the AR glass may provide a guide GUI for adjusting the position of the smartphone on the glass as an AR object. That is, the AR glass may provide the target position of the smartphone based on the position adjustment information on the glass, and guide the position. Here, an AR object is a virtual object related to the actual object included in an image, and in the disclosure, an AR object may be used to represent a guide GUI for adjusting the position of a smart phone.

According to an example embodiment, an AR object may be provided to an image photographed by a camera. For example, an AR object may be provided in various forms, such as being displayed while being rendered on a photographed image, being displayed in the form of an on-screen display (OSD) on a photographed image, or being displayed on a layer that is different from the layer wherein a photographed image is displayed.

According to another example embodiment, an AR object may be provided based on the position of an object that is shown to a user through glass implemented as a transparent display. For example, an AR object may be provided on glass based on a method such as digital light processing (DLP) and a laser scanning projector (LSP).

So far, descriptions have been made by assuming a case of selfie photography wherein an image is photographed by a front camera. However, the example embodiments may be implemented using an image photographed by a rear camera as well as a front camera.

Figure 3:
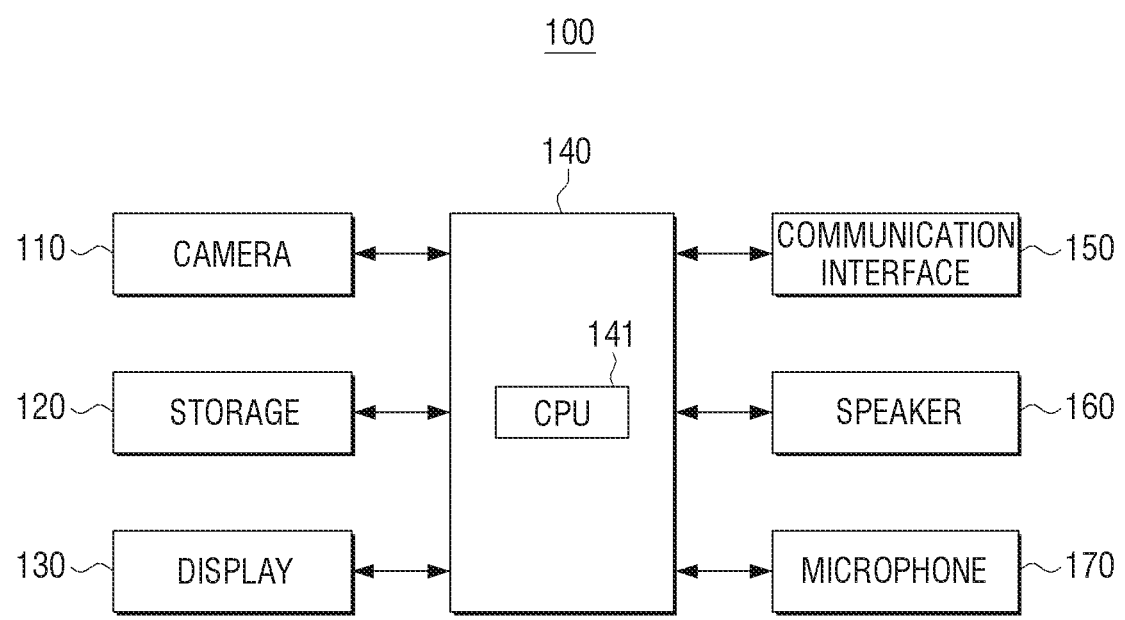
FIG. 3 is a block diagram for illustrating the electronic apparatus of FIG. 2 in further detail.

FIG. 3 is a block diagram for illustrating the electronic apparatus of FIG. 2 in greater detail.

According to FIG. 3, the electronic apparatus 100 includes a camera 110, a storage 120, a display 130, a processor 140, a communication interface 150 and a speaker 160. Regarding the components illustrated in FIG. 3 that overlap with the components illustrated in FIG. 2, detailed description will be omitted.

The processor 140 may include a CPU 141, a ROM (or nonvolatile memory) storing a control program for controlling the electronic apparatus 100 and a RAM (or volatile memory) which stores data that is input from the outside of the electronic apparatus 100 or is used as a storing area corresponding to the various kinds of work performed at the electronic apparatus 100.

Further, when a preset event occurs, the processor 140 may execute the operating system (OS), programs and various applications stored in the storage 120. Also, the processor 140 may include a single core, a dual core, a triple core, a quad core and a core of multiple numbers thereof.

The CPU 141 accesses the storage 120, and performs booting by using the O/S stored in the storage 120. Also, the CPU performs diverse operations by using various kinds of programs, contents, data and the like stored in the storage 120.

The communication interface 150 performs communication with an external apparatus (e.g., an accessory including a sensor) or an external electronic apparatus (e.g., AR glass). Here, the communication interface 150 may perform wireless communication with the user terminal device 200 by a communication method such as Bluetooth (BT), wireless fidelity (Wi-Fi), zigbee and infrared (IR). Also, the processor 140 may perform communication with an external apparatus or an external electronic apparatus through various communication methods such as a serial interface, a universal serial bus (USB) and near field communication (NFC).

For example, when a preset event occurs, the communication interface 150 may become an interlocked state by performing communication according to a predefined communication method with an external apparatus or an external electronic apparatus. Here, interlocking may mean all states wherein communication is possible, such as an operation of initializing communication between the electronic apparatus 100 and an external apparatus or an external electronic apparatus, an operation of forming a network and an operation of performing paring of apparatuses. For example, apparatus identification information of an external apparatus or an external electronic apparatus may be provided to the electronic apparatus 100, and a process of paring between the two apparatuses may be performed accordingly. As an example, when a preset event occurs in the electronic apparatus 100 or an external apparatus or an external electronic apparatus, nearby apparatuses may be searched through a digital living network alliance (DLNA) technology, and paring with the searched apparatuses may be performed, and as a result, the communication interface 150 may become an interlocked state.

In particular, position information may be received from an external apparatus through the communication interface 150, and an image including the electronic apparatus 100 may be received from an external electronic apparatus.

The speaker 160 is a component for outputting various kinds of sound. In particular, the speaker 160 may output a voice guide for adjusting the photographing position of the camera 110 or a voice guide for moving the face region of a user according to the control by the processor 140. Further, when the photographing position of the camera 110 or the face region of a user is adjusted to a target position, the speaker 160 may output a voice feedback informing this according to the control by the processor 140.

The microphone 170 is a component for receiving voice uttered by a user. The microphone 170 may receive voice related to photographing, and transmit the voice to the processor 140.

Figure 4:
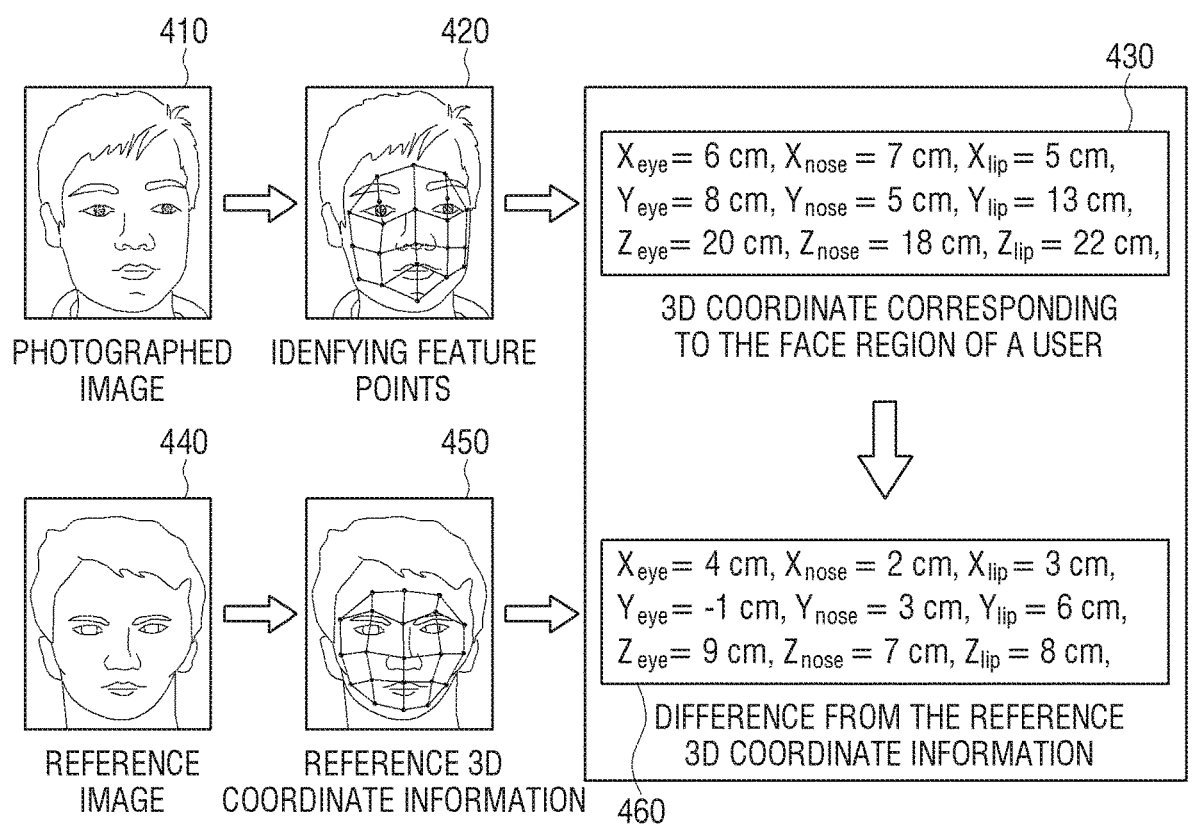
FIG. 4 is a diagram for illustrating the process of obtaining position adjustment information according to an example embodiment.

FIG. 4 is a diagram for illustrating the process of obtaining position adjustment information according to an example embodiment.

The electronic apparatus 100 may obtain a 3D coordinate corresponding to the face region of a user included in an image 410 that is photographed through the camera 1100.

According to an example embodiment, the electronic apparatus 100 may identify a plurality of feature points 420 in the face region of a user. Here, the features points may be feature points included in at least one of the eye, nose or mouth of a user. For identifying features points in the face region of a user, technologies such as face detection and face recognition may be used. The electronic apparatus 100 may calculate information on the distance among the feature points based on the number of pixels, and obtain a 3D coordinate based on the calculated distance information.

In addition, the electronic apparatus 100 may calculate distance information such as the size of the eye, the distance between the eyes, the length of the nose and the length of the lip based on the number of pixels. Further, the electronic apparatus 100 may obtain a 3D coordinate corresponding to the face region of a user by correcting the distance information to be more precise by comparing the calculated distance information with the stored information on average faces or the stored information on the face of the user. For example, the electronic apparatus 100 may calculate the distance between the face of the user and the camera 110 based on the information on the distance between the eyes calculated from a photographed image.

In addition, the electronic apparatus 100 may calculate information on angles of facial features based on comparison of the sizes of the eyes, the angle of the line connecting the eyes, the angle of the nose line and the angle of the lip line.

For example, a 3D coordinate is represented by a rectangular coordinate system in which a starting point is the camera 110. According to the rectangular coordinate system, the electronic apparatus 100 may identify the eye, nose and mouth in the face region of a user as feature points, and obtain a rectangular coordinate value of which starting point is the camera 110, based on the number of pixels. As an example, the electronic apparatus 100 may obtain 3D coordinates 430 for the eye, nose and mouth such as {$X_{eye}$=6 cm, $Y_{eye}$=8 cm, $Z_{eye}$=20 cm}, {$X_{nose}$=7 cm, $Y_{nose}$=5 cm, $Z_{nose}$=18 cm} and {$X_{lip}$=5 cm, $Y_{lip}$=13 cm, $Z_{lip}$=22 cm}.

Further, the electronic apparatus 100 may obtain, from a reference image 440, a 3D coordinate corresponding to the face region of the user included in a photographed image, and may compare the 3D coordinate with reference 3D coordinate information 450. The electronic apparatus 100 may store the reference image 440, or store only the reference 3D coordinate information 450.

Then, the electronic apparatus 100 may obtain position adjustment information for adjusting the photographing position of the camera 110 by calculating a difference between a 3D coordinate corresponding to the face region of the user included in a photographed image and the reference 3D coordinate information 460.

For example, the electronic apparatus 100 may obtain {$X_{eye}$=4 cm, $Y_{eye}$=−1 cm, $Z_{eye}$=9 cm}, {$X_{nose}$=2 cm, $Y_{nose}$=3 cm, $Z_{nose}$=7 cm} and {$X_{lip}$=3 cm, $Y_{lip}$=6 cm, $Z_{lip}$=8 cm} corresponding to the difference value between the 3D coordinate obtained for the eye, nose and mouth and the reference 3D coordinate information as position adjustment information.

Meanwhile, in a case in which the position of the camera 110 is moved to a target position according to a guide GUI, the 3D coordinate obtained in the target position and the reference 3D coordinate information may be identical.

The electronic apparatus 100 may provide the display 130 with a guide GUI for adjusting the position of the camera 110 based on the obtained position adjustment information.

FIGS. 7A-7D are diagrams for illustrating the types of guide GUIs according to an example embodiment.

Figure 7A:
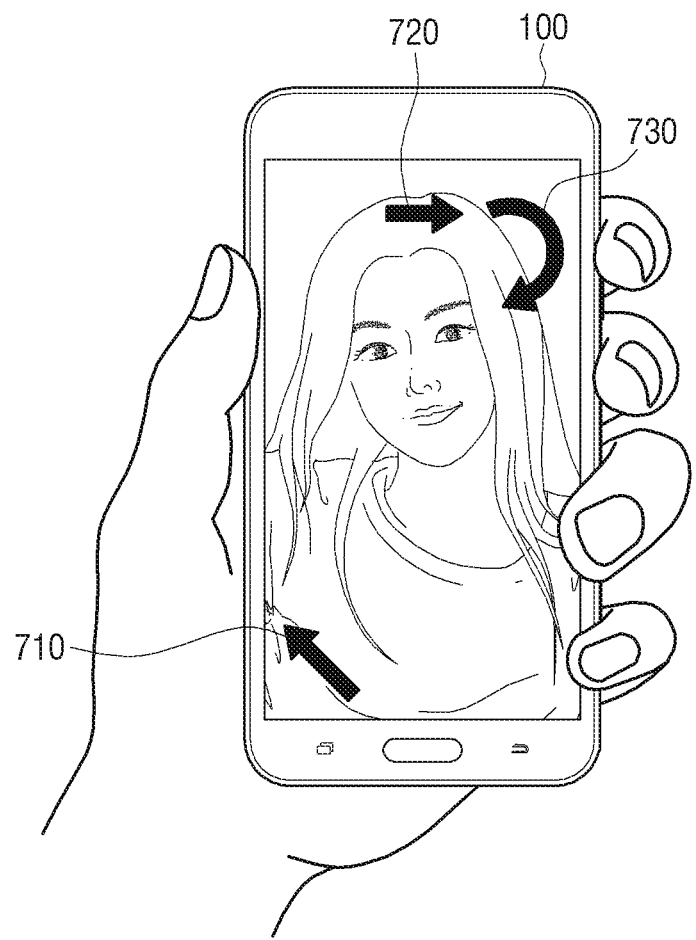
FIGS. 7A, 7B, 7C, and 7D are diagrams for illustrating the types of guide graphic user interfaces (GUIs) according to an example embodiment.

According to FIG. 7A, the electronic apparatus 100 may provide guide GUIs 710, 720, and 730 based on the position adjustment information for adjusting the photographing position of the camera 110.

Here, the position adjustment information may include information on the moving distance of the camera 110 by which the camera 110 is to be moved, the moving direction of the camera 110, the rotating direction of the camera 110 and the degree of rotation of the camera 110, according to the difference between the obtained 3D coordinate and the reference 3D coordinate information. Further, the position adjustment information may be 3D coordinate information corresponding to the difference between the obtained 3D coordinate and the reference 3D coordinate information.

Meanwhile, the guide GUIs 710, 720, and 730 may indicate at least one of the moving distance of the camera 110, the moving direction of the camera 110, the rotating direction of the camera 110 or the degree of rotation of the camera 110. For example, the guide GUIs 710, 720, and/or 730 may have the shape of an arrow that indicates directions for displaying the moving direction and the rotating direction. Also, the guide GUIs 710, 720, and/or 730 may be provided as signs in the shape of an arrow that indicates a clockwise direction or a counterclockwise direction for displaying the rotating direction.

For example, the electronic apparatus 100 may provide a guide GUI that includes a first graphic item 710, a second graphic item 720, and a third graphic item 730. The first graphic item 710 may guide the user to move the lower end of the electronic apparatus 100 to the upper left side, the second graphic item 720 may guide the user to move the electronic apparatus 100 to the right side, and the third graphic item 730 may guide the user to rotate the electronic apparatus 100 in the direction of an arrow. Here, the guide GUI is described as including the three graphic items 710, 720, and 730, but each of the graphic items 710, 720, and 730 may be referred to as a guide GUI. For example, the third graphic item 730 may be referred to as a rotation guide GUI.

Figure 7B:
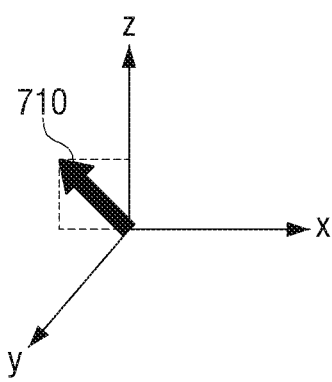
Figure 7B:
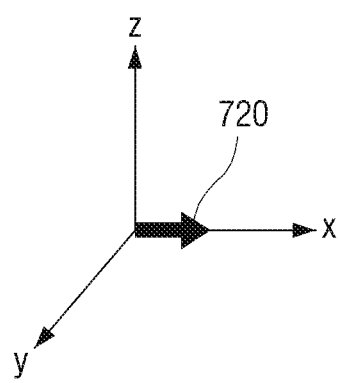
Figure 7B:
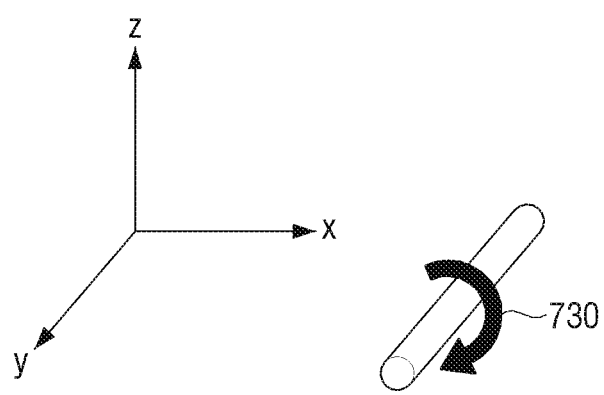

According to FIG. 7B, the electronic apparatus 100 may display the first graphic item 710, the second graphic item 720, and the third graphic item 730 on XYZ axes, respectively.

For example, it is assumed that the first graphic item 710, the second graphic item 720, and the third graphic item 730 are displayed on XYZ axes. As an example, for displaying movement on XZ axes, the electronic apparatus 100 may display a dotted line on the XZ axes and display an arrow, and thereby provide the first graphic item 710 that guides movement of the electronic apparatus 100 to the upper left side. Also, the electronic apparatus 100 may display an arrow guiding movement on an X axis, and thereby provide the second graphic item 720 that guides the electronic apparatus 100 to the right side. In addition, the electronic apparatus 100 may display an arrow in a clockwise direction that guides rotational movement, and thereby provide the third graphic item 730. Further, the electronic apparatus 100 may display a separate rotating axis, and thereby display rotating directions clearly. As an example, the electronic apparatus 100 may display a rotating axis corresponding to the Y axis, and use an arrow in a clockwise direction, and thereby provide the third graphic item 730. Further, the electronic apparatus 100 may provide the third graphic item 730 on the XYZ axes without a separate rotating axis.

Meanwhile, the electronic apparatus 100 may display an angle by which the electronic apparatus 100 is to be rotated in the direction indicated by the third graphic item 730.

As guide GUIs are displayed on XYZ axes and are thus provided more stereoscopically, a user can move the electronic apparatus 100 to a target position according to position adjustment information easily.

Figure 7C:
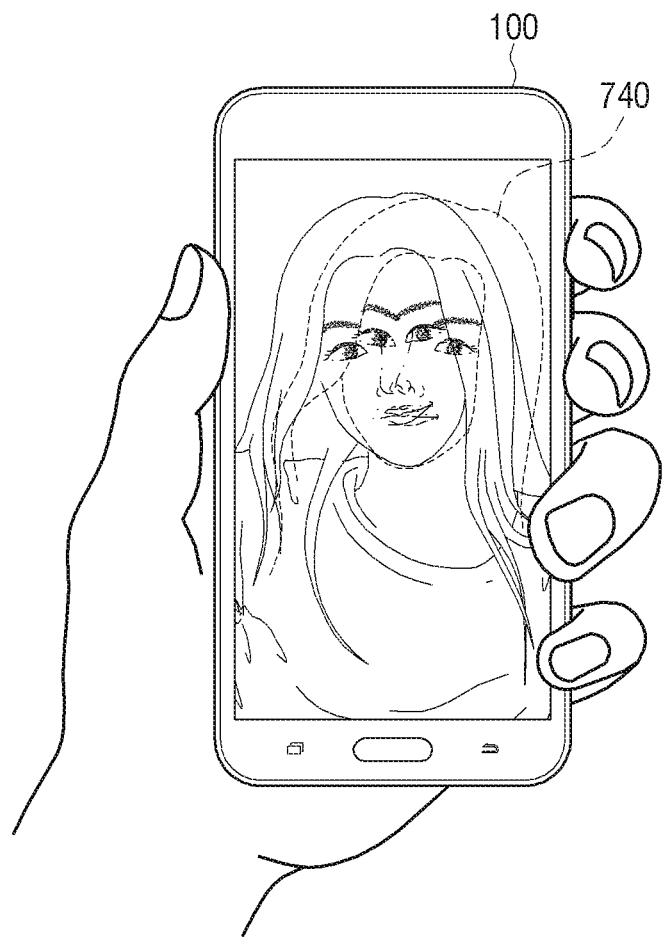

According to FIG. 7C, the electronic apparatus 100 may obtain information for moving the face region of a user based on a difference between a 3D coordinate corresponding to the face region of the user included in a photographed image and the stored reference 3D coordinate information, and provide a guide GUI 740 for moving the face region of the user based on the obtained information.

Here, the information for moving the face region of the user may include information on the moving distance by which the face region of the user is to be moved, the moving direction, the rotating direction and the degree of rotation, according to the difference between the obtained 3D coordinate and the reference 3D coordinate information. Also, the information for moving the face region of the user may be 3D coordinate information corresponding to the difference between the obtained 3D coordinate and the reference 3D coordinate information.

The electronic apparatus 100 may provide the display 130 with the guide GUI 740 that guides movement of the face region of a user while maintaining the photographing position of the camera 110.

Here, the guide GUI 740 that corresponds to the face of a user may be in the form wherein the face region of the user photographed is virtually moved and displayed. As an example, as illustrated in FIG. 7C, the electronic apparatus 100 may provide a guide GUI in the form wherein the face region of a user photographed is displayed in a target position with dotted lines. Also, the guide GUI 740 that corresponds to the face of a user may be displayed in the form of a circle or an oval. However, the disclosure is not limited thereto, and the guide GUI 740 can be implemented in various forms if it is a component that performs the role of guiding movement of a user's body.

Figure 7D:
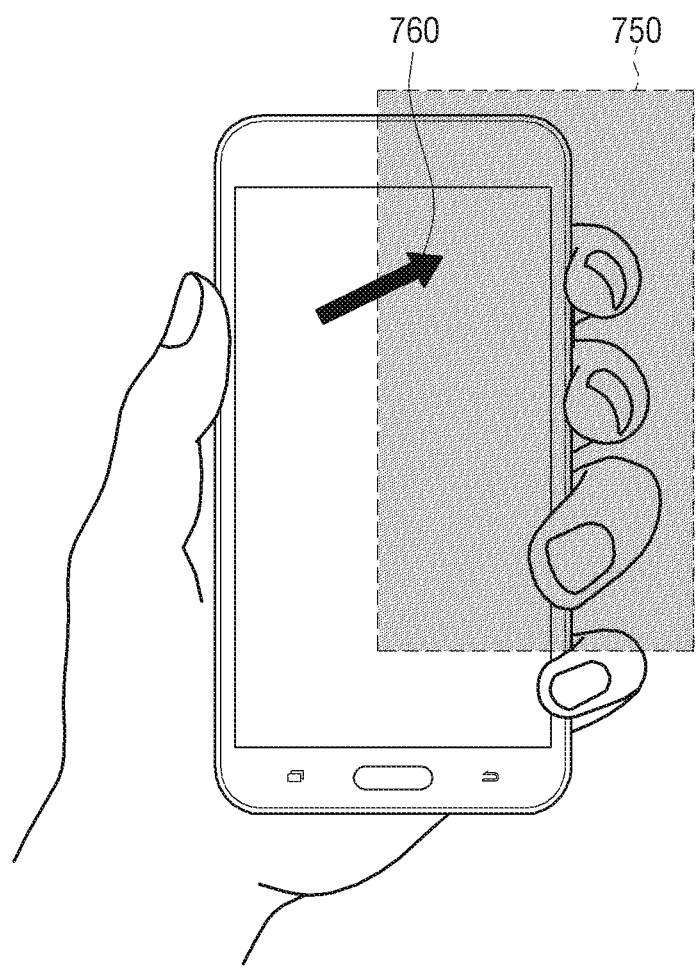

FIG. 7D is a diagram for illustrating guide GUIs in case the electronic apparatus 100 is implemented as AR glass.

In a case in which the electronic apparatus 100 is implemented as AR glass, the AR glass may obtain position adjustment information for adjusting the photographing position of a smart phone based on a difference between a 3D coordinate corresponding to the face region of a user included in a photographed image and the stored reference 3D coordinate information. Further, the AR glass may provide a guide GUI 750 for adjusting the position of the smart phone based on the obtained position adjustment information to the glass (display).

That is, the AR glass may provide the target position of a smart phone based on position adjustment information to the glass, and thereby guide the position.

Also, the AR glass may provide a guide GUI 760 in the shape of an arrow and thereby guide the direction and the distance by which the smart phone is to be moved.

Figure 8:
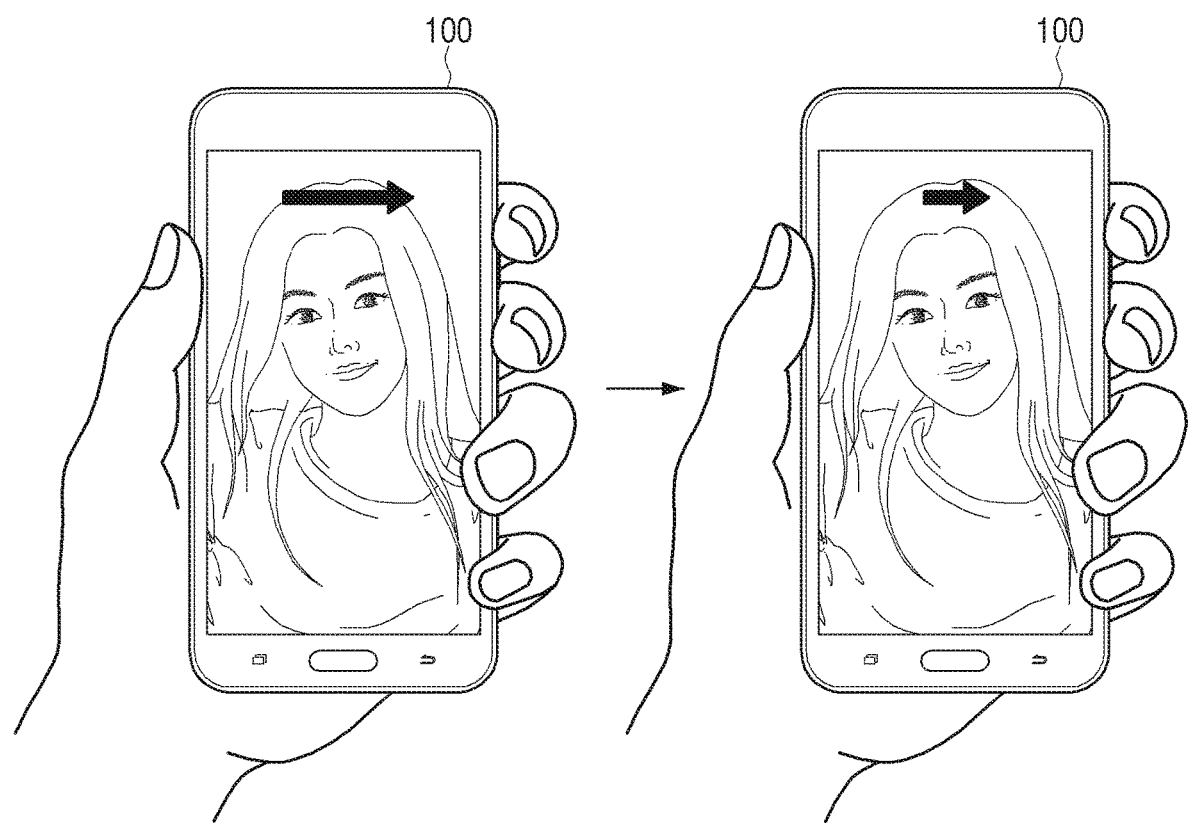
FIG. 8 is a diagram for illustrating a guide GUI which is in proportion to the degree of movement of a camera according to an example embodiment.

FIG. 8 is a diagram for illustrating a guide GUI which is in proportion to the degree of movement of a camera according to an example embodiment.

FIG. 8 is a diagram wherein an arrow is provided as a guide GUI, and the electronic apparatus 100 may display the moving distance of the camera 110 by adjusting the length of the arrow. That is, the electronic apparatus 100 may display the length of the arrow to be in proportion to the moving distance of the camera 110. For example, when the electronic apparatus 100 determines that the camera 110 needs to be moved to the right side by 20 cm based on the obtained position adjustment information, the electronic apparatus 100 may display a rightwards arrow having the length of 2 cm on the display 130. Afterwards, when the camera 110 is moved to the right side by 10 cm, the electronic apparatus 100 may adjust the length of the rightwards arrow to 1 cm. The length of the rightwards arrow may gradually decrease as the camera 110 moves closer to a target position, and may gradually increase as the camera 110 moves away from the target position. In a case where the target position is located on the left side of the electronic apparatus 100, the electronic apparatus 100 may display a leftwards arrow instead of the rightwards arrow.

Also, the electronic apparatus 100 may adjust the length of the arrow to display the degree of rotation of the camera 110 as well as the moving distance.

Meanwhile, the numerical values with respect to the moving distance of the camera 110 or the moving distance of the arrow are merely examples, and the disclosure is obviously not limited thereto.

Figure 9:
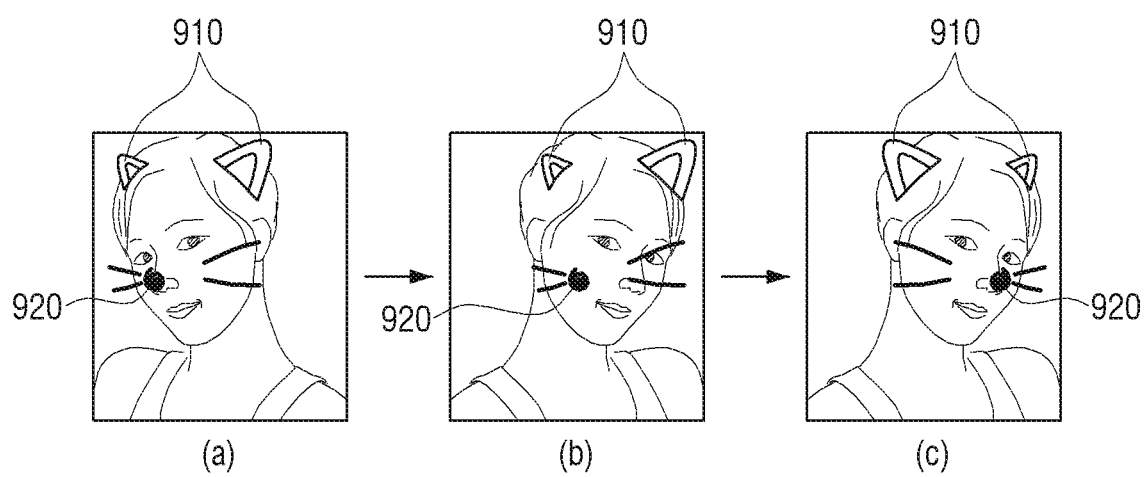
FIG. 9 is a diagram for illustrating adjustment of a sticker added to a user image according to an example embodiment.

FIG. 9 is a diagram for illustrating adjustment of a sticker that is added to a user image, according to an example embodiment.

A sticker may be all objects added to a user image to decorate the user image included in a photographed image.

According to FIG. 9, a sticker may be implemented in a form wherein a shape in the form of a rabbit's ears 910 is added to the face region of a user.

The electronic apparatus 100 may adjust at least one of the size, direction or form of a sticker to be added to a user image based on a 3D coordinate corresponding to the face region of the user included in a photographed image. Here, as various embodiments of obtaining a 3D coordinate corresponding to the face region of a user were described earlier, detailed description therefor will be omitted.

As illustrated in image (a) of FIG. 9, when the user looks at the left, the electronic apparatus 100 may obtain a 3D coordinate corresponding thereto. Then, based on the obtained 3D coordinate, the electronic apparatus 100 may adjust the sizes of the rabbit ears 910 on the left and right sides. As an example, the electronic apparatus 100 may express a cubic effect 920 by adjusting the size of the rabbit ear 910 on the right side to be bigger than the size of the rabbit ear 910 on the left side.

Afterwards, if the user looks at the right by changing his or her posture, the user may not be able to obtain a precise 3D coordinate according to his or her movement, even though the user's posture has been changed, and therefore in related art, the size and direction of the sticker may not be adjusted to correspond to the changed posture, as illustrated in image (b) of FIG. 9.

However, according to an example embodiment, a 3D coordinate corresponding to the face region of a user included in a photographed image can be obtained in real time. Thus, as illustrated in image (c) of FIG. 9, the electronic apparatus 100 may adjust the size and direction of the sticker to correspond to the user image. For example, as illustrated in image (c) of FIG. 9, when the user looks at the left, the electronic apparatus 100 may express a cubic effect 920 by adjusting the size of the rabbit ear 910 on the left side to be bigger than the size of the rabbit ear 910 on the right side.

As described above, according to an example embodiment, a sticker is applied based on a 3D coordinate. Thus, a sticker can be applied to a user image while being adjusted relatively precisely.

FIG. 9 illustrates an embodiment wherein a shape in the form of a rabbit's ears 910 is added to the face region of a user image. However, various stickers may be applied based on a 3D coordinate, for example, a form wherein a cosmetic effect is applied to a user image.

Figure 10:
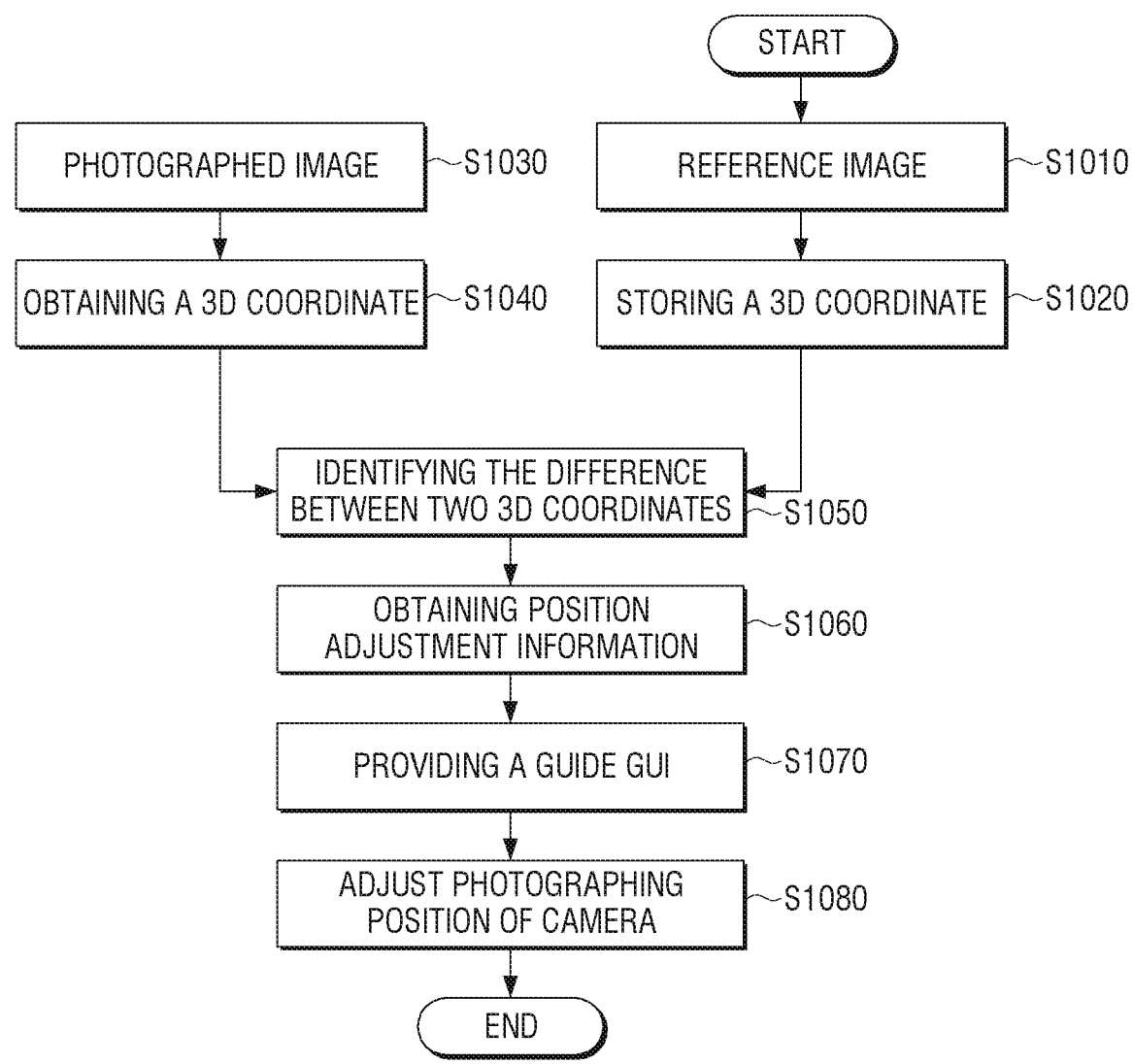
FIG. 10 is a sequence diagram for illustrating an operation of guiding the movement of a camera by comparing 3D coordinates according to an example embodiment.

FIG. 10 is a sequence diagram for illustrating an operation of guiding the movement of a camera by comparing 3D coordinates according to an example embodiment.

The electronic apparatus 100 may store a reference image in operation S1010. Here, the reference image may be at least one of an image selected by a user or an image provided by the electronic apparatus 100, or it may be a target image aimed by an image photographed by a user.

Also, the electronic apparatus 100 may obtain a 3D coordinate from a reference image, and store the information on the 3D coordinate in operation S1020. Here, reference 3D coordinate information is information on a 3D coordinate corresponding to the face region included in the reference image. Meanwhile, the electronic apparatus 100 may not store a reference image separately, but store only the reference 3D coordinate information obtained from the reference image.

The electronic apparatus 100 may photograph an image including the face region of a user in operation S1030. Further, the electronic apparatus 100 may obtain a 3D coordinate corresponding to the face region of the user from the photographed image in operation S1040. Here, the photographed image may be an image in a preview state where the face region of a user can be checked. As various embodiments of obtaining a 3D coordinate corresponding to the face region of a user were described earlier, detailed description therefor will be omitted.

The electronic apparatus 100 may identify a difference between two 3D coordinates in operation S1050. The electronic apparatus 100 may obtain position adjustment information for adjusting the photographing position of the camera 110 based on a difference between a 3D coordinate corresponding to the face region of the user included in a photographed image and the stored reference 3D coordinate information, in operation S1060.

Here, position adjustment information may include information on the moving distance of the camera 110 by which the camera 110 is to be moved, the moving direction of the camera 110, the rotating direction of the camera 110 and the degree of rotation of the camera 110, according to the difference between the obtained 3D coordinate and the reference 3D coordinate information. Further, the position adjustment information may be 3D coordinate information corresponding to the difference between the obtained 3D coordinate and the reference 3D coordinate information.

Meanwhile, the electronic apparatus 100 may provide a guide GUI for adjusting the photographing position of the camera 110 based on the obtained position adjustment information in operation S1070. The electronic apparatus 100 may determine a movement direction of the electronic apparatus 100 in which the obtained 3D coordinate and the reference 3D coordinate information decreases, and may generate the guide GUI to indicate the movement direction.

Here, the guide GUI may be a sign including at least one of the moving distance of the camera 110, the moving direction of the camera 110, the rotating direction of the camera 110 or the degree of rotation of the camera 110. For example, the guide GUI may be provided as a sign in the shape of an arrow that indicates directions for displaying the moving direction and the rotating direction. Also, the guide GUI may be provided as a sign in the shape of an arrow that indicates a clockwise direction or a counterclockwise direction for displaying the rotating direction. The guide GUI may also be displayed on XYZ axes.

The photographing position of the camera 110 may be adjusted based on a user's manipulation in operation S1080. As the photographing position of the camera 110 is changed as described above, a photographed image in a preview state may be changed.

When the photographing position of the camera 110 is adjusted to a target position displayed by the guide GUI, the electronic apparatus 100 may perform photographing automatically.

FIG. 11 is a flow chart for illustrating a method of controlling an electronic apparatus according to an example embodiment.

The electronic apparatus 100 may obtain a 3D coordinate corresponding to the face region of a user included in an image photographed through the camera 110, in operation S1110.

According to an example embodiment, the electronic apparatus 100 may identify a plurality of feature points from the face region of a user, calculate information on the distance among the feature points based on the number of pixels, and obtain a 3D coordinate based on the calculated distance information. Here, the feature points may be at least one of the eye, nose or mouth of the user.

According to another example embodiment, the electronic apparatus 100 may, based on receiving from an external apparatus included in a photographed image the position information of the external apparatus, obtain first distance information between the electronic apparatus and the external apparatus based on the received position information, obtain second distance information between the external apparatus included in the photographed image and at least one feature point included in the face region of the user, and obtain a 3D coordinate based on the first distance information and the second distance information. Here, the external apparatus may be an apparatus provided with a sensor that can calculate distance from the electronic apparatus 100. Meanwhile, position information may be information including at least one of the distance between the electronic apparatus 100 and the external apparatus or the angle. Also, a sensor may be implemented as an IR sensor, an accelerometer, an angular velocity sensor, a gyro sensor, a hall sensor, an ultrasonic sensor and the like.

According to still another example embodiment, the electronic apparatus 100 may, based on receiving from an external electronic apparatus an image including the electronic apparatus 100, compare the size of the electronic apparatus 100 obtained from the received image with the actual size of the pre-stored electronic apparatus 100, and thereby obtain a 3D coordinate. Here, the external electronic apparatus may be implemented as AR glass including a camera. Also, the sizes may be information including the horizontal length, longitudinal length and thickness of the electronic apparatus 100.

The electronic apparatus 100 may calculate the distance between the electronic apparatus 100 and the face region of the user by comparing the size of the electronic apparatus 100 calculated from an image received from an external electronic apparatus with the actual size of the electronic apparatus 100. Also, the electronic apparatus 100 may calculate the size of the electronic apparatus 100 from the received image based on the number of pixels.

Further, the electronic apparatus 100 may obtain position adjustment information for adjusting the photographing position of the camera 110 based on a difference between the obtained 3D coordinate and reference 3D coordinate information in operation S1120. Here, the photographing position of the camera 110 may include at least one of the photographing distance between the face region of the user and the camera 110, the photographing direction or the photographing angle.

Also, the electronic apparatus 100 may provide a guide GUI for adjusting the photographing position of the camera 110 based on the obtained position adjustment information in operation S1130. Here, the guide GUI may include at least one of the moving distance of the camera 110, the moving direction of the camera 110, the rotating direction of the camera 110 or the degree of rotation of the camera 110.

According to another example embodiment, the electronic apparatus 100 may obtain information for moving the face region of a user based on a difference between a 3D coordinate corresponding to the face region of a user included in a photographed image and reference 3D coordinate information, and provide a guide GUI for moving the face region of the user based on the obtained information.

According to still another example embodiment, the electronic apparatus 100 may provide a guide for adjusting the photographing position of the camera 110 or moving the face region of a user as voice. For example, the electronic apparatus 100 may provide voice such as "Move the camera to the right side by 10 cm" or "Tilt your face to the left side by 15 degrees" through a speaker, based on the obtained position adjustment information or information for moving the face region of a user.

As detailed operations in each step were described earlier, detailed description therefor will be omitted.

Meanwhile, at least some of the components used in the methods according to the various embodiments of the disclosure described above may be installed on conventional electronic apparatuses, or may be implemented in the form of an application which is software that a user will directly use in an operating system (OS). An application may be provided in the form of an icon interface on the screen of the electronic apparatus 100.

Also, at least some of the components in the various embodiments of the disclosure described above may be implemented through an embedded server provided to an electronic apparatus, or through an external server of an electronic apparatus.

Meanwhile, the various embodiments of the disclosure described above may be implemented in a recording medium that is readable by a computer or a device similar thereto, by using software, hardware or a combination thereof. In some cases, the embodiments described in this specification may be implemented as a processor itself. According to implementation by software, the embodiments such as procedures and functions described in this specification may be implemented as separate software modules. Each of the software modules may perform one or more functions and operations described in this specification.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

In case instructions are executed by the processor of an electronic apparatus, a non-transitory computer-readable medium may store computer instructions that make the electronic apparatus perform an operation of obtaining a 3D coordinate corresponding to the face region of a user included in an image photographed by a camera, an operation of obtaining position adjustment information for adjusting the photographing position of the camera based on a difference between the obtained 3D coordinate and reference 3D coordinate information, and an operation of providing a guide GUI for adjusting the photographing position of the camera based on the obtained position adjustment information.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An augmented reality (AR) glasses, the AR glasses comprising:
   a camera;
   a display;
   a communication interface for communicating with an electronic apparatus;
   a memory; and
   at least one processor configured to execute instructions stored in the memory at least to:
     obtain an image, from the electronic apparatus via the communication interface, including the AR glasses worn by a user, wherein the image obtained by a camera of the electronic apparatus;
     obtain a three dimensional (3D) coordinate of a face region of the user based on the obtained image;
     obtain position adjustment information for adjusting a photographing position of the electronic apparatus based on a difference between the 3D coordinate of the face region and a reference 3D coordinate stored in the memory; and
     control the display to display a guide graphic user interface (GUI) for adjusting the photographing position of the electronic apparatus based on the position adjustment information,
   wherein the guide GUI is represented by a virtual object and includes at least one of a rotating direction of the electronic apparatus and a degree of rotation of the electronic apparatus.

2. The AR glasses of claim 1, wherein the at least one processor is further configured to:
   obtain the reference 3D coordinate from a reference image;
   determine a size difference between a size of at least one organ located in the face region in the obtained image of the user, and a size of a corresponding organ in the reference image; and
   obtain the position adjustment information based on the size difference between the least one organ located in the face region in the obtained image of the user and the size of the corresponding organ in the reference image.

3. The AR glasses of claim 1,
   wherein the photographing position of the electronic apparatus includes at least one of a photographing distance between the face region of the user and electronic apparatus, a photographing direction, and a photographing angle.

4. The AR glasses of claim 1,
   wherein the at least one processor is further configured to identify a plurality of feature points from the face region of the user, calculate information on distance between the plurality of feature points based on a number of pixels in the distance, and obtain the 3D coordinate of the face region based on the information on the distance.

5. The AR glasses of claim 1, wherein the at least one processor is further configured to:
   receive position information of the electronic apparatus from the electronic apparatus;
   obtain first distance information between the AR glasses and the external electronic apparatus based on the position information of the electronic apparatus;
   obtain second distance information between the AR glasses included in the image and at least one feature point included in the face region of the user; and
   obtain the 3D coordinate of the face region based on the first distance information and the second distance information.

6. The AR glasses of claim 1,
   wherein the at least one processor is configured to obtain an image of the electronic apparatus by the camera, and obtain the 3D coordinate of the face region based on comparison between a size of the electronic apparatus obtained from the image of the electronic apparatus and an actual size of the electronic apparatus stored in the memory.

7. The AR glasses of claim 1,
   wherein the at least one processor is further configured to control the display to adjust at least one of a size, a direction, and a form of a sticker to be added to the image of the user on the 3D coordinate of the face region, and display the image of the user with the sticker.

8. A method of controlling an augmented reality (AR) glasses and storing a reference three-dimensional (3D) coordinate, the method of controlling the AR glasses comprising:
   obtaining an image, from an electronic apparatus, including the AR glasses worn by a user, wherein the image obtained by a camera of the electronic apparatus;
   obtaining a 3D coordinate corresponding to a face region of the user based on the obtained image;
   obtaining position adjustment information for adjusting a photographing position of the electronic apparatus based on a difference between the 3D coordinate of the face region and the reference 3D coordinate; and
   displaying a guide graphic user interface (GUI) for adjusting the photographing position of the electronic apparatus based on the position adjustment information,
   wherein the guide GUI is represented by a virtual object and includes at least one of a rotating direction of the electronic apparatus and a degree of rotation of the electronic apparatus.

9. The method of controlling the electronic AR glasses of claim 8, further comprising:
   obtaining information for moving the face region of the user based on the difference between the 3D coordinate of the face region and the reference 3D coordinate; and
   providing the guide GUI for moving the face region of the user based on the information for moving the face region of the user.

10. The method of controlling the AR glasses of claim 8,
    wherein the photographing position of the electronic apparatus includes at least one of a photographing distance between the face region of the user and the electronic apparatus, a photographing direction, and a photographing angle.

11. The method of controlling the AR glasses of claim 8, wherein the obtaining the 3D coordinate comprises:
    identifying a plurality of feature points from the face region of the user, calculating information on a distance between the plurality of feature points based on a number of pixels in the distance, and obtaining the 3D coordinate of the face region based on the information on the distance.

12. The method of controlling the AR glasses of claim 8, wherein the obtaining the 3D coordinate comprises:
    receiving, position information of the electronic apparatus from the electronic apparatus;
    obtaining first distance information between the AR glasses and the electronic apparatus based on the position information of the electronic apparatus;
    obtaining second distance information between the AR glasses included in the image and at least one feature point included in the face region of the user; and
    obtaining the 3D coordinate based on the first distance information and the second distance information.

13. The method of controlling the AR glasses of claim 8, wherein the obtaining the 3D coordinate comprises:
    based on obtaining an image including the electronic apparatus, obtaining the 3D coordinate by comparing a size of the electronic apparatus obtained from the image of the electronic apparatus with a pre-stored actual size of the electronic apparatus.

14. The method of controlling the AR glasses of claim 8, further comprising:
    adjusting at least one of a size, a direction, and a form of a sticker to be added to the user in the image based on the 3D coordinate of the face region, and displaying the image with the sticker.

15. A non-transitory computer-readable storage medium storing a program that is executable by a computer to perform a method of controlling an augmented reality (AR) glasses worn and storing a reference three-dimensional (3D) coordinate, the method of controlling the AR glasses comprising:
    obtaining an image, from an electronic apparatus, including the AR glasses worn by a user, wherein the image obtained by a camera of the electronic apparatus;
    obtaining a 3D coordinate corresponding to a face region of the user based on the obtained image;
    obtaining position adjustment information for adjusting photographing position of the electronic apparatus based on a difference between the 3D coordinate of the face region and the reference 3D coordinate; and displaying a guide graphic user interface (GUI) for adjusting the photographing position of the electronic apparatus based on the position adjustment information, wherein the guide GUI represents by virtual object and includes at least one of a rotating direction of the electronic apparatus and a degree of rotation of the electronic apparatus.

16. The AR glasses of claim 1, wherein the position adjustment information comprises a moving distance between the electronic apparatus and the camera of the electronic apparatus, and wherein the at least one processor is further configured to control the display to provide the GUI comprising an arrow, and adjust a length of the arrow in proportion to the moving distance between the electronic apparatus and the camera of the electronic apparatus.

17. The AR glasses of claim 1, wherein the at least one processor is further configured to determine, XYZ-axes displacements of the 3D coordinate of the face region relative to the reference 3D coordinate, as the difference between the 3D coordinate of the face region and the reference 3D coordinate.

* * * * *